(12) United States Patent     (10) Patent No.:   US 12,634,740 B2
Li et al.     (45) Date of Patent:    May 19, 2026

(54) COMMUNICATION METHOD, APPARATUS, AND SYSTEM

(71) Applicant: Huawei Technologies Co., Ltd., Shenzhen (CN)

(72) Inventors: Hancheng Li, Shanghai (CN); Han Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 937 days.

(21) Appl. No.: 17/738,778

(22) Filed: May 6, 2022

(65) Prior Publication Data

US 2022/0264355 A1     Aug. 18, 2022

Related U.S. Application Data

(63) Continuation of application No. PCT/CN2020/127293, filed on Nov. 6, 2020.

(30) Foreign Application Priority Data

Nov. 8, 2019    (CN) .......................... 201911090227.9

(51) Int. Cl.
*H04W 28/00*     (2009.01)
*H04W 28/02*     (2009.01)
*H04W 28/12*     (2009.01)

(52) U.S. Cl.
CPC ....... *H04W 28/0236* (2013.01); *H04W 28/12* (2013.01)

(58) Field of Classification Search
None
See application file for complete search history.

(56) References Cited

U.S. PATENT DOCUMENTS

2021/0029590 A1   1/2021   Ying et al.
2022/0304085 A1*   9/2022   Lee ........................ H04W 76/23

FOREIGN PATENT DOCUMENTS

CN     101384076 A    3/2009
CN     106453138 A    2/2017
(Continued)

OTHER PUBLICATIONS

3GPP TSG-SA WG2 Meeting #129, S2-1812232.*
(Continued)

*Primary Examiner* — Abdelillah Elmejjarmi
(74) *Attorney, Agent, or Firm* — Conley Rose, P.C.

(57)     ABSTRACT

A communication method comprises that an application function network element first obtains transport information for a data stream, where the transport information includes information about an ingress port for the data stream and information about an egress port for the data stream. The application function network element then determines, based on the transport information, that the data stream is a data stream between terminal devices. The data stream is carried in two sessions. One session is a first session corresponding to the information about the ingress port, and the other session is a second session corresponding to the information about the egress port. The application function network element then can trigger a core network device to initiate policy and charging control (PCC) rule configuration processes for the first session and the second session, so that the data stream can be created.

20 Claims, 16 Drawing Sheets

(56) References Cited

FOREIGN PATENT DOCUMENTS

| | | | |
|---|---|---|---|
| CN | 110267312 | A | 9/2019 |
| CN | 110324152 | A | 10/2019 |
| CN | 110366132 | A | 10/2019 |
| WO | 2018191109 | A1 | 10/2018 |
| WO | 2019166081 | A1 | 9/2019 |
| WO | 2019197426 | A1 | 10/2019 |

OTHER PUBLICATIONS

3GPP TS 23.501 V16.2.0, Sep. 2019, "3rd Generation Partnership Project; Technical Specification Group Services and System Aspects; System Architecture for the 5G System (5GS); Stage 2," 389 pages.
3GPP TS 23.502 V16.2.0, Sep. 2019, "3rd Generation Partnership Project; Technical Specification Group Services and System Aspects; Procedures for the 5G System (5GS); Stage 2 (Release 16)," 524 pages.
LG Electronics et al., "Conclusion of Solution#8," SA WG2 Meeting #129, S2-1810858, Oct. 15-19, 2018, Dongguan, P. R. China, 4 pages.
Huawei et al., "Updates on Solution #18", 3GPP TSG-SA WG2 Meeting #129Bis S2-1812232, Nov. 26-30, 2018, 8 Pages.

* cited by examiner

Switching node

COMMUNICATION METHOD, APPARATUS, AND SYSTEM

CROSS-REFERENCE TO RELATED APPLICATIONS

This is a continuation of International Patent Application No. PCT/CN2020/127293 filed on Nov. 6, 2020, which claims priority to Chinese Patent Application No. 201911090227.9 filed on Nov. 8, 2019. The disclosures of the aforementioned applications are hereby incorporated by reference in their entireties.

TECHNICAL FIELD

This disclosure relates to the field of communication technologies, and in particular, to a communication method, an apparatus, and a system.

BACKGROUND

Different from a conventional Ethernet that cannot provide highly reliable data transmission and ensure a deterministic transmission delay, Time-Sensitive Networking (TSN) emerges based on the conventional Ethernet. The TSN has both real-time performance and certainty, and can ensure reliability of service data transmission. In addition, an end-to-end transmission delay in a data transmission process can also be predicted.

To implement end-to-end reliable data transmission in a 5th generation (5G) mobile communication system by using the TSN, the 5G system is virtualized as a switching node in the TSN, to form a network architecture in which the 5G system interworks with the TSN. In this network architecture, after receiving an indication of a configuration network element in the TSN, a control plane network element in the 5G system may create a data stream between user equipment (UE) and a user plane (UP) network element, and configure a forwarding rule for the data stream, to implement data transmission between the UE and the UP network element.

However, based on a data stream creation mechanism in an existing network architecture in which the 5G system interworks with the TSN, the 5G system cannot create a data stream between UEs, and data transmission between UEs cannot be implemented.

SUMMARY

This disclosure provides a communication method, an apparatus, and a system, to create a data stream between terminal devices.

According to a first aspect, an embodiment of this disclosure provides a communication method. The method includes: an application function network element may first obtain transport information for a data stream. The transport information for the data stream includes information about an ingress port for the data stream and information about an egress port for the data stream. Then, the application function network element determines, based on the transport information for the data stream, that the data stream is a data stream between terminal devices. To be specific, the data stream is carried in two sessions: one is a first session corresponding to the information about the ingress port, and the other is a second session corresponding to the information about the egress port. The application function network element may trigger a core network device to configure a policy and charging control (PCC) rule for the first session and configure a PCC rule for the second session.

According to the foregoing method, when determining that the data stream is a data stream between the terminal devices, the application function network element can trigger the core network device to initiate two PCC rule configuration (for example, creation or modification) processes for different sessions, so that the data stream between the terminal devices can be created.

In a possible design, if the information about the ingress port includes an identifier of the ingress port of the data stream, and the information about the egress port includes an identifier of the egress port of the data stream, when determining, based on the transport information for the data stream, that the data stream is a data stream between the terminal devices, the application function network element may determine, based on the identifier of the egress port and the identifier of the ingress port, that the data stream is between a first terminal device and a second terminal device. The identifier of the egress port is an identifier of a port on a side of the second terminal device, and the identifier of the ingress port is an identifier of a port on a side of the first terminal device.

According to the foregoing method, the application function network element can conveniently and quickly determine that the data stream is a data stream between the terminal devices.

In a possible design, that the application function network element determines, based on the identifier of the egress port and the identifier of the ingress port, that the data stream is between a first terminal device and a second terminal device includes:

The application function network element determines, based on an association between the identifier of the egress port and the first session and an association between the identifier of the ingress port and the second session, that the data stream is a data stream between the terminal devices. For example, the application function network element may obtain an association relationship between a port on a terminal device side and a session. If it is determined that both the ingress port and the egress port of the data stream correspond to a session, it indicates that the data stream is a data stream between the terminal devices.

According to the foregoing method, the application function network element can conveniently and quickly determine, based on an association relationship between the ingress port and the egress port and the session, that the data stream is a data stream between the terminal devices.

In a possible design, the data stream is a data stream between the first terminal device and the second terminal device, the first session is a session established by the first terminal device, and the second session is a session established by the second terminal device.

In a possible design, before the application function network element obtains the transport information for the data stream, the application function network element determines that the first terminal device and the second terminal device can communicate with each other. The application function network element may report, based on obtained delay information of the first terminal device and delay information of the second terminal device, a transmission delay between the port on the side of the first terminal device and the port on the side of the second terminal device to a device in time sensitive networking. The delay information of the second terminal device indicates a transmission delay between the port on the side of the second terminal device and a data network. The delay information of the first terminal device indicates a transmission delay between the port on the side of the first terminal device and the data network. The port on the side of the first terminal device may include the ingress port of the foregoing data stream, and the port on the side of the second terminal device may include the egress port of the foregoing data stream.

According to the foregoing method, the application function network element reports the transmission delay between the port on the side of the first terminal device and the port on the side of the second terminal device, so that the device in the time sensitive networking can determine scheduling information of the data stream between the first terminal device and the second terminal device.

In a possible design, before the application function network element obtains the transport information for the data stream, when the first terminal device establishes the first session, the application function network element receives the delay information of the first terminal device; and when the second terminal device establishes the second session (for example, in a process of establishing the second session, or after establishment of the second session is completed), the application function network element receives the delay information of the second terminal device and third indication information. The third indication information indicates that the port on the side of the first terminal device and the port on the side of the second terminal device are a port pair, in other words, the first terminal device and the second terminal device can communicate with each other. The application function network element may determine, based on the third indication information, that the first terminal device and the second terminal device can communicate with each other.

According to the foregoing method, the application function network element can conveniently determine, based on the third indication information, that the first terminal device and the second terminal device can communicate with each other, to subsequently report the transmission delay between the port on the side of the first terminal device and the port on the side of the second terminal device to the device in the time sensitive networking.

In a possible design, before the application function network element obtains the transport information for the data stream, when the second terminal device establishes the second session, the application function network element receives the delay information of the second terminal device; and when the first terminal device establishes the first session (for example, in a process of establishing the first session, or after establishment of the first session is completed), the application function network element receives the delay information of the first terminal device and fourth indication information. The fourth indication information indicates that the port on the side of the first terminal device and the port on the side of the second terminal device are a port pair, in other words, the first terminal device and the second terminal device can communicate with each other. The application function network element may determine, based on the fourth indication information, that the first terminal device and the second terminal device can communicate with each other.

According to the foregoing method, the application function network element can conveniently determine, based on the fourth indication information, that the first terminal device and the second terminal device can communicate with each other, to subsequently report the transmission delay between the port on the side of the first terminal device and the port on the side of the second terminal device to the device in the time sensitive networking.

In a possible design, before the application function network element obtains the transport information for the data stream, when the first terminal device establishes the first session (for example, in a process of establishing the first session, or after establishment of the first session is completed), the application function network element receives the delay information of the first terminal device; and when the second terminal device establishes the second session, the application function network element receives the delay information of the second terminal device.

The application function network element may locally store group information, where the group information records group members included in a communication group; and determine, based on the group information, that the first terminal device and the second terminal device can communicate with each other. The group information may alternatively be obtained by the application function network element from another network element.

According to the foregoing method, the application function network element can conveniently determine, based on the group information, that the first terminal device and the second terminal device can communicate with each other, to subsequently report the transmission delay between the port on the side of the first terminal device and the port on the side of the second terminal device to the device in the time sensitive networking.

In a possible design, when triggering the core network device to configure the PCC rule for the first session corresponding to the information about the ingress port, the application function network element may further send first indication information to the core network device. The first indication information indicates that the data stream is a data stream between the terminal devices.

According to the foregoing method, the application function network element may notify the core network device that the data stream is a data stream between the terminal devices, so that the core network device can create the data stream between the terminal devices.

In a possible design, there are many manners in which the first indication information indicates that the data stream is a data stream between the terminal devices. A direct indication manner may be used. For example, the first indication information is a character indicating that the data stream is a data stream between the terminal devices. Alternatively, an indirect indication manner may be used. The following lists several indirect indication manners.

Manner 1: The first indication information includes the identifier of the ingress port of the data stream and the identifier of the egress port of the data stream.

Manner 2: The first indication information includes an identifier of the first session and an identifier of the second session.

Manner 3: The first indication information includes the identifier of the egress port or an identifier of the second session.

According to the foregoing method, the first indication information may flexibly indicate, in a plurality of indication manners, that the data stream is a data stream between the terminal devices.

In a possible design, when triggering the core network device to configure the PCC rule for the second session corresponding to the information about the egress port, the application function network element may further send second indication information to the core network device. The second indication information indicates that the data stream is a data stream between the terminal devices.

According to the foregoing method, the application function network element may notify the core network device that the data stream is a data stream between the terminal devices, so that the core network device can create the data stream between the terminal devices.

In a possible design, there are many manners in which the second indication information indicates that the data stream is a data stream between the terminal devices. A direct indication manner may be used. For example, a character indicating that the data stream is a data stream between the terminal devices is sent. Alternatively, an indirect indication manner may be used. The following lists several indirect indication manners.

Manner 1: The second indication information includes the identifier of the ingress port of the data stream and the identifier of the egress port of the data stream.

Manner 2: The second indication information includes an identifier of the first session and an identifier of the second session.

Manner 3: The second indication information includes the identifier of the ingress port or an identifier of the first session.

According to the foregoing method, the second indication information may flexibly indicate, in a plurality of indication manners, that the data stream is a data stream between the terminal devices.

In a possible design, if the information about the ingress port includes an identifier of the first session and the information about the egress port includes an identifier of the second session, the application function network element may determine, on the basis that the information about the ingress port includes the identifier of the first session and the information about the egress port includes the identifier of the second session, that the data stream is a data stream between the terminal devices.

According to the foregoing method, if the transport information for the data stream carries identifiers of two sessions, the application function network element determines that the data stream is a data stream between the terminal devices.

According to a second aspect, an embodiment of this disclosure provides a communication method. The method includes: a session management network element may receive a first forwarding rule creation request from a policy control function network element. The first forwarding rule creation request indicates to create a forwarding rule for a first session carrying a data stream, and the first forwarding rule creation request includes first indication information. The first indication information may indicate that the data stream is between terminal devices. After determining, based on the first indication information, that the data stream is a data stream between the terminal devices, the session management network element may configure the forwarding rule for the first session to local forwarding based on the first forwarding rule creation request.

According to the foregoing method, after determining that the data stream is a data stream between the terminal devices, the session management network element creates a data stream between terminal devices by configuring the forwarding rule for the first session to local forwarding.

In a possible design, the first indication information has a plurality of indication manners. For example, a direct indication manner may be used. For example, the first indication information is a character indicating that the data stream is a data stream between the terminal devices. In this way, the session management network element can directly determine, based on the first indication information, that the data stream is a data stream between the terminal devices. In another example, the first indication information may also use an indirect indication manner. The following lists several indirect indication manners in which the session management network element may directly determine, based on the first indication information, that the data stream is a data stream between the terminal devices.

Manner 1: The first indication information includes the identifier of the ingress port of the data stream and the identifier of the egress port of the data stream.

The session management network element may determine, based on an association relationship between an identifier of a port on a terminal device side and a session and based on an association between a session and each of the identifier of the ingress port and the identifier of the egress port, that the data stream is a data stream between the terminal devices. For example, the association is that the egress port is associated with the first session, and the ingress port is associated with a second session.

Manner 2: The first indication information includes an identifier of the first session and an identifier of a second session.

The session management network element may directly determine, on the basis that the first indication information includes the identifier of the first session and the identifier of the second session, that the data stream is carried in the two sessions, to further determine that the data stream is a data stream between the terminal devices.

Manner 3: The first indication information includes the identifier of the egress port or an identifier of a second session carrying the data stream.

The session management network element may determine, based on an association relationship between an identifier of a port on a terminal device side and a session and based on the identifier of the egress port, that the data stream is a data stream between the terminal devices, where the identifier of the egress port is an identifier of a port on a side of a second terminal device; or determine, based on the identifier of the second session carrying the data stream, that the data stream is a data stream between the terminal devices.

According to the foregoing method, the session management network element can relatively flexibly determine that the data stream is a data stream between the terminal devices, and the method is applicable to different scenarios.

In a possible design, the session management network element receives a second forwarding rule creation request from the policy control function network element. The second forwarding rule creation request indicates to create a forwarding rule for a second session carrying the data stream, and the second forwarding rule creation request includes second indication information. The second indication information may indicate that the data stream is a data stream between the terminal devices. After determining, based on the second indication information, that the data stream is a data stream between the terminal devices, the session management network element may configure the forwarding rule for the second session to local forwarding based on the second forwarding rule creation request.

According to the foregoing method, after determining that the data stream is a data stream between the terminal devices, the session management network element creates a data stream between terminal devices by configuring the forwarding rule for the second session to local forwarding.

In a possible design, the second indication information has a plurality of indication manners. For example, a direct indication manner may be used. For example, the second indication information is a character indicating that the data stream is a data stream between the terminal devices. In this way, the session management network element can directly determine, based on the second indication information, that the data stream is a data stream between the terminal devices. In another example, the second indication information may also use an indirect indication manner. The following lists several indirect indication manners in which the session management network element may directly determine, based on the second indication information, that the data stream is a data stream between the terminal devices.

Manner 1: The second indication information includes the identifier of the ingress port of the data stream and the identifier of the egress port of the data stream.

The session management network element may determine, based on an association relationship between an identifier of a port on a terminal device side and a session and based on an association between a session and each of the identifier of the ingress port and the identifier of the egress port, that the data stream is a data stream between the terminal devices. For example, the egress port is associated with the first session, and the ingress port is associated with a second session.

Manner 2: The second indication information includes an identifier of the first session and an identifier of a second session.

The session management network element may directly determine, on the basis that the second indication information includes the identifier of the first session and the identifier of the second session, that the data stream is carried in the two sessions, to further determine that the data stream is a data stream between the terminal devices.

Manner 3: The second indication information includes the identifier of the ingress port or an identifier of the first session carrying the data stream.

The session management network element may determine, based on an association relationship between an identifier of a port on a terminal device side and a session and based on the identifier of the ingress port, that the data stream is between terminal devices, where the identifier of the ingress port is an identifier of a port on a side of a first terminal device; or determine, based on the identifier of the first session carrying the data stream, that the data stream is between terminal devices.

According to the foregoing method, the session management network element can relatively flexibly determine that the data stream is a data stream between the terminal devices, and the method is applicable to different scenarios.

In a possible design, the data stream is a data stream between the first terminal device and the second terminal device, the identifier of the ingress port is an identifier of the port on the side of the first terminal device, the identifier of the egress port is the identifier of the port on the side of the second terminal device.

In a possible design, the session management network element may obtain delay information of the second terminal device; and if determining that the second terminal device and the first terminal device can communicate with each other, send the delay information of the second terminal device and third indication information to an application function network element. The third indication information indicates that the port on the side of the first terminal device and the port on the side of the second terminal device are a port pair.

According to the foregoing method, the session management network element may notify the application function network element that the first terminal device and the second terminal device can communicate with each other.

In a possible design, the session management network element may obtain delay information of the first terminal device; and if determining that the first terminal device and the first terminal device can communicate with each other, send the delay information of the first terminal device and fourth indication information to an application function network element. The fourth indication information indicates that the port on the side of the first terminal device and the port on the side of the second terminal device are a port pair.

According to the foregoing method, the session management network element may notify the application function network element that the first terminal device and the second terminal device can communicate with each other.

According to a third aspect, an embodiment of this disclosure provides a communication method. The method includes: a policy control function network element receives a first message of an application function network element. The first message includes information for configuring a PCC rule for a first session carrying a data stream and information about a second session carrying the data stream. The policy control function network element determines, based on the information about the second session, that the data stream is a data stream between terminal devices. The policy control function network element separately initiates a process of creating/modifying the PCC rule for the first session and a process of creating/modifying a PCC rule for the second session.

According to the foregoing method, when determining that the data stream is a data stream between the terminal devices, the policy control function network element can initiate two PCC rule configuration (for example, creation or modification) processes for different sessions, so that the data stream between the terminal devices can be created.

In a possible design, the information about the second session includes an identifier of a port of the second session. When determining, based on the information about the second session, that the data stream is a data stream between the terminal devices, the policy control function network element may determine, based on an association relationship between an identifier of a port on a terminal device side and a session and based on the identifier of the port of the second session, that the data stream is a data stream between the terminal devices.

According to the foregoing method, the policy control function network element can conveniently and quickly determine that the data stream is a data stream between the terminal devices.

In a possible design, the data stream is a data stream between a first terminal device and a second terminal device, and the first message further includes a part or all of the following information: delay information of the first session, delay information of the second session, and third delay information.

The delay information of the first session indicates a transmission delay between a port on a side of the first terminal device and a data network. The delay information of the second session indicates a transmission delay between a port on a side of the second terminal device and the data network. The third delay information indicates a transmission delay between the port on the side of the first terminal device and the port on the side of the second terminal device.

According to the foregoing method, the first message may carry other information, so that signaling can be effectively saved, and the policy control function network element can obtain other information in advance.

In a possible design, when the policy control function network element separately initiates the process of creating/modifying the PCC rule for the first session and the process of creating/modifying the PCC rule for the second session, the policy control function network element may determine 5G quality of service identifiers (5QIs) of the first session and the second session based on the first message; and then send the 5QIs of the first session and the second session to a session management network element.

For example, the first message includes the delay information of the first session. The policy control function network element may determine the 5QI of the first session based on the delay information of the first session, and set the 5QI of the second session to the 5QI of the first session.

The first message includes the delay information of the second session and delay information of the first session. The policy control function network element may determine the 5QI of the first session based on the delay information of the first session, and determine the 5QI of the second session based on the delay information of the second session.

The first message includes the third delay information, and the policy control function network element may determine the 5QIs of the first session and the second session based on the third delay information.

According to the foregoing method, the policy control function network element may determine the 5QIs of the first session and the second session by using the first message, and separately create/modify the PCC rule for the first session and the PCC for the second session.

According to a fourth aspect, an embodiment of this disclosure provides a communication method. The method includes: a session management network element receives a forwarding rule creation request of a policy control function network element. The forwarding rule creation request indicates to create a forwarding rule for a first session carrying a data stream, and the forwarding rule creation request includes information about a second session carrying the data stream. The session management network element determines, based on the information about the second session, that the data stream is a data stream between terminal devices. The session management network element configures the forwarding rule for the first session to local forwarding and configures the forwarding rule for the second session to local forwarding.

According to the foregoing method, when determining that the data stream is a data stream between the terminal devices, the session management network element can initiate two forwarding rule creation processes for different sessions, so that the data stream between the terminal devices can be created.

In a possible design, the information about the second session includes an identifier of a port of the second session. When determining, based on the information about the second session, that the data stream is a data stream between the terminal devices, the session management network element may determine, based on a correspondence between an identifier of a port on a terminal device side and a session and based on the identifier of the port of the second session, that the data stream is a data stream between the terminal devices.

According to the foregoing method, the session management network element can conveniently and quickly determine that the data stream is a data stream between the terminal devices.

In a possible design, the information about the second session includes a session identifier of the second session. When determining, based on the information about the second session, that the data stream is a data stream between the terminal devices, the session management network element determines, based on the identifier of the second session, that the data stream is a data stream between the terminal devices.

According to the foregoing method, the session management network element can conveniently and quickly determine that the data stream is a data stream between the terminal devices.

According to a fifth aspect, an embodiment of this disclosure further provides a communication system. For beneficial effects, refer to descriptions in the first aspect and the second aspect. Details are not described herein again. The communication system includes an application function network element and a session management network element.

The application function network element is configured to: obtain transport information for a data stream, where the transport information for the data stream includes information about an ingress port for the data stream and information about an egress port for the data stream; determine, based on the transport information for the data stream, that the data stream is between terminal devices; and send first indication information to the session management network element via a policy control function network element.

The session management network element is configured to: receive a first forwarding rule creation request from the policy control function network element, where the first forwarding rule creation request indicates to create a forwarding rule for a first session carrying the data stream, and the first forwarding rule creation request includes the first indication information; determine, based on the first indication information, that the data stream is a data stream between the terminal devices; and configure the forwarding rule for the first session to local forwarding based on the first forwarding rule creation request.

In a possible design, the information about the ingress port includes an identifier of the ingress port of the data stream, and the information about the egress port includes an identifier of the egress port of the data stream. When determining, based on the transport information for the data stream, that the data stream is a data stream between the terminal devices, the application function network element may determine, based on the identifier of the egress port and the identifier of the ingress port, that the data stream is between a first terminal device and a second terminal device. The identifier of the egress port is an identifier of a port on a side of a second terminal device, and the identifier of the ingress port is an identifier of a port on a side of a first terminal device.

In a possible design, when determining, based on the identifier of the egress port and the identifier of the ingress port, that the data stream is a data stream between the terminal devices, the application function network element may determine, based on an association between the identifier of the egress port and the first session and an association between the identifier of the ingress port and the second session, that the data stream is a data stream between the terminal devices.

In a possible design, the data stream is a data stream between the first terminal device and the second terminal device, the first session is a session established by the first terminal device, and the second session is a session established by the second terminal device.

In a possible design, before the application function network element obtains the transport information for the data stream, the application function network element may determine that the first terminal device and the second terminal device can communicate with each other; and report, based on obtained delay information of the first terminal device and delay information of the second terminal device, a transmission delay between a port on the side of the first terminal device and a port on the side of the second terminal device to a device in time sensitive networking. The delay information of the second terminal device indicates a transmission delay between the port on the side of the second terminal device and a data network. The delay information of the first terminal device indicates a transmission delay between the port on the side of the first terminal device and the data network.

In a possible design, the session management network element may obtain delay information of the second terminal device; and after determining that the second terminal device and the first terminal device can communicate with each other, send the delay information of the second terminal device and third indication information to an application function network element. The third indication information indicates that a port on the side of the first terminal device and a port on the side of the second terminal device are a port pair. When the first terminal device establishes the first session, the application function network element receives the delay information of the first terminal device. When the second terminal device establishes the second session, the application function network element receives the delay information of the second terminal device and the third indication information from the session management network element. The application function network element determines, based on the third indication information, that the first terminal device and the second terminal device can communicate with each other.

In a possible design, the session management network element may obtain the delay information of the first terminal device; and after determining that the second terminal device and the first terminal device can communicate with each other, send the delay information of the first terminal device and fourth indication information to the application function network element. The fourth indication information indicates that a port on the side of the first terminal device and a port on the side of the second terminal device are a port pair. When the second terminal device establishes the second session, the application function network element receives the delay information of the second terminal device. When the first terminal device establishes the first session, the application function network element receives the delay information of the first terminal device and fourth indication information from the session management network element. The application function network element determines, based on the fourth indication information, that the first terminal device and the second terminal device can communicate with each other.

In a possible design, before the application function network element obtains the transport information for the data stream, when the first terminal device establishes the first session, the application function network element may receive the delay information of the first terminal device; and when the second terminal device establishes the second session, the application function network element may receive the delay information of the second terminal device. The application function network element may determine, based on group information, that the first terminal device and the second terminal device can communicate with each other.

In a possible design, the first indication information includes the identifier of the egress port or an identifier of the second session. When determining, based on the first indication information, that the data stream is a data stream between the terminal devices, the session management network element may determine, based on an association relationship between an identifier of a port on a terminal device side and a session and based on the identifier of the egress port, that the data stream is a data stream between the terminal devices, where the identifier of the egress port is an identifier of a port on a side of a second terminal device; or may determine, based on the identifier of the second session carrying the data stream, that the data stream is a data stream between the terminal devices.

In a possible design, the information about the ingress port includes an identifier of the first session, and the information about the egress port includes an identifier of the second session. When determining, based on the transport information for the data stream, that the data stream is a data stream between the terminal devices, the application function network element may determine, on the basis that the information about the ingress port includes the identifier of the first session and the information about the egress port includes the identifier of the second session, that the data stream is a data stream between the terminal devices.

In a possible design, the application function network element may further send second indication information to the session management network element via the policy control function network element.

The session management network element may further receive a second forwarding rule creation request from the policy control function network element, where the second forwarding rule creation request indicates to create a forwarding rule for a second session carrying the data stream, and the second forwarding rule creation request includes second indication information; determine, based on the second indication information, that the data stream is a data stream between the terminal devices; and configure the forwarding rule for the second session to local forwarding based on the second forwarding rule creation request.

In a possible design, the second indication information includes the identifier of the ingress port or an identifier of the first session. When determining, based on the second indication information, that the data stream is a data stream between the terminal devices, the session management network element may determine, based on an association relationship between an identifier of a port on a terminal device side and a session and based on the identifier of the ingress port, that the data stream is a data stream between the terminal devices, where the identifier of the ingress port is an identifier of a port on a side of a first terminal device; or may determine, based on the identifier of the first session carrying the data stream, that the data stream is a data stream between the terminal devices.

According to a sixth aspect, an embodiment of this disclosure further provides a communication apparatus. The communication apparatus is applied to an application function network element. For beneficial effects, refer to the descriptions in the first aspect. Details are not described herein again. The apparatus has a function of implementing the behavior in the method example in the first aspect. The function may be implemented by hardware, or may be implemented by hardware executing corresponding software. The hardware or software includes one or more modules corresponding to the foregoing functions. In a possible design, a structure of the apparatus includes a receiving unit and a processing unit, and may further include a sending unit. These units may perform corresponding functions in the method example in the first aspect. For details, refer to the detailed descriptions in the method example. Details are not described herein again.

According to a seventh aspect, an embodiment of this disclosure further provides a communication apparatus. The communication apparatus is applied to a session management network element. For benefits, refer to the descriptions in the second aspect. Details are not described herein again. The apparatus has a function of implementing the behavior in the method example in the second aspect. The function may be implemented by hardware, or may be implemented by hardware executing corresponding software. The hardware or software includes one or more modules corresponding to the foregoing functions. In a possible design, a structure of the apparatus includes a receiving unit and a processing unit, and may further include a sending unit. These units may perform corresponding functions in the method example in the second aspect. For details, refer to the detailed descriptions in the method example. Details are not described herein again.

According to an eighth aspect, an embodiment of this disclosure further provides a communication apparatus. The communication apparatus is applied to a policy control function network element. For beneficial effects, refer to the descriptions in the third aspect. Details are not described herein again. The apparatus has a function of implementing the behavior in the method example in the third aspect. The function may be implemented by hardware, or may be implemented by hardware executing corresponding software. The hardware or software includes one or more modules corresponding to the foregoing functions. In a possible design, a structure of the apparatus includes a receiving unit and a sending unit, and may further include a processing unit. These units may perform corresponding functions in the method example in the third aspect. For details, refer to the detailed descriptions in the method example. Details are not described herein again.

According to a ninth aspect, an embodiment of this disclosure further provides a communication apparatus. The communication apparatus is applied to a session management network element. For benefits, refer to the descriptions in the fourth aspect. Details are not described herein again. The apparatus has a function of implementing the behavior in the method example in the fourth aspect. The function may be implemented by hardware, or may be implemented by hardware executing corresponding software. The hardware or software includes one or more modules corresponding to the foregoing functions. In a possible design, a structure of the apparatus includes a receiving unit and a processing unit, and may further include a sending unit. These units may perform corresponding functions in the method example in the fourth aspect. For details, refer to the detailed descriptions in the method example. Details are not described herein again.

According to a tenth aspect, an embodiment of this disclosure further provides a communication apparatus. The communication apparatus is applied to an application function network element. For beneficial effects, refer to the descriptions in the first aspect. Details are not described herein again. A structure of the communication apparatus includes a processor and a memory. The processor is configured to support a base station in performing a corresponding function in the method in the first aspect. The memory is coupled to the processor, and stores program instructions and data that are necessary for the communication apparatus. The structure of the communication apparatus further includes a communication interface, configured to communicate with another device.

According to an eleventh aspect, an embodiment of this disclosure further provides a communication apparatus. The communication apparatus is applied to a session management network element. For benefits, refer to the descriptions in the second aspect. Details are not described herein again. A structure of the communication apparatus includes a processor and a memory. The processor is configured to support a base station in performing a corresponding function in the method in the second aspect. The memory is coupled to the processor, and stores program instructions and data that are necessary for the communication apparatus. The structure of the communication apparatus further includes a communication interface, configured to communicate with another device.

According to a twelfth aspect, an embodiment of this disclosure further provides a communication apparatus. The communication apparatus is applied to a policy control function network element. For beneficial effects, refer to the descriptions in the third aspect. Details are not described herein again. A structure of the communication apparatus includes a processor and a memory. The processor is configured to support a base station in performing a corresponding function in the method in the third aspect. The memory is coupled to the processor, and stores program instructions and data that are necessary for the communication apparatus. The structure of the communication apparatus further includes a communication interface, configured to communicate with another device.

According to a thirteenth aspect, an embodiment of this disclosure further provides a communication apparatus. The communication apparatus is applied to a session management network element. For benefits, refer to the descriptions in the fourth aspect. Details are not described herein again. A structure of the communication apparatus includes a processor and a memory. The processor is configured to support a base station in performing a corresponding function in the method in the fourth aspect. The memory is coupled to the processor, and stores program instructions and data that are necessary for the communication apparatus. The structure of the communication apparatus further includes a communication interface, configured to communicate with another device.

According to a fourteenth aspect, this disclosure further provides a computer-readable storage medium. The computer-readable storage medium stores instructions, and when the instructions are run on a computer, the computer is enabled to perform the methods according to the foregoing aspects.

According to a fifteenth aspect, this disclosure further provides a computer program product including instructions. When the computer program product runs on a computer, the computer is enabled to perform the methods according to the foregoing aspects.

According to a sixteenth aspect, this disclosure further provides a computer chip. The chip is connected to a memory. The chip is configured to read and execute a software program stored in the memory, to perform the methods according to the foregoing aspects.

DESCRIPTION OF EMBODIMENTS

This disclosure provides a communication method, an apparatus, and a system, to create a data stream between UEs.

To make the objectives, technical solutions, and advantages of this disclosure clearer, the following further describes this disclosure in detail with reference to the accompanying drawings. In the descriptions of this disclosure, unless otherwise specified, "/" indicates an "or" relationship between associated objects. For example, A/B may indicate A or B. The term "and/or" in this disclosure describes only an association relationship between the associated objects and indicates that three relationships may exist. For example, A and/or B may indicate the following three cases: only A exists, both A and B exist, and only B exists, where A and B may be singular or plural. In addition, in the descriptions of this disclosure, "a plurality of" means two or more than two, unless otherwise specified.

Embodiments of this disclosure relate to a communication method in which a 5G system is virtualized as a switching node in TSN by integrating the 5G system and the TSN. The following first describes the 5G system, the TSN, and a network architecture to which embodiments of this disclosure are applicable.

Figure 1:
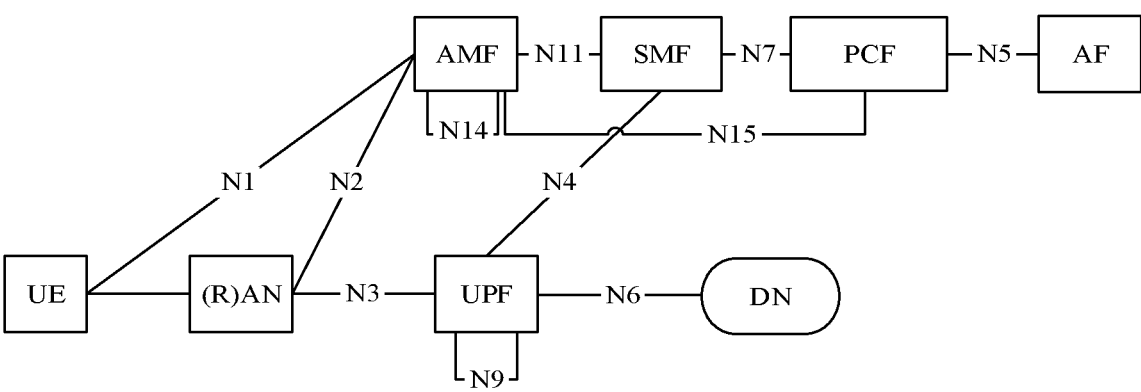
FIG. 1 is a schematic diagram of a network architecture of a 5G system.

FIG. 1 is a schematic diagram of a network architecture of a 5G system. The network architecture is a 5G network architecture. Network elements in the 5G architecture include a terminal device. In FIG. 1, an example in which the terminal device is UE is used. The network architecture further includes a radio access network (RAN), an access and mobility management function (AMF) network element, a session management function (SMF) network element, a user plane function (UPF) network element, a policy control function (PCF) network element, an application function (AF) network element, a data network (DN), and the like.

A main function of the RAN is to control a user to access a mobile communication network in a radio manner. The RAN is a part of a mobile communication system. The RAN implements a radio access technology. Conceptually, the RAN resides between a device (for example, a mobile phone, a computer, or any remote controller) and a core network, and provides a connection between the device and the core network. The AMF network element is responsible for access management and mobility management of a terminal. In actual application, the AMF network element includes a mobility management function of an MME in a Long-Term Evolution network architecture, and further includes an access management function.

The SMF network element is responsible for session management such as user session establishment.

The UPF network element is a function network element of a UP, and is mainly responsible for connecting to an external network. The UPF network element includes related functions of a serving gateway (SGW) and a public data network gateway (PDN-GW) in LTE.

The DN is responsible for providing a service for the terminal. For example, some DNs provide a network access function for the terminal, and some other DNs provide a text messaging function for the terminal.

A main function of the PCF network element is policy control execution. Similar to a policy and charging rules function (PCRF) network element in LTE, the PCF network element is mainly responsible for policy authorization, quality of service, and charging rule generation, and delivers a corresponding rule to the UPF network element via the SMF network element, to complete installation of a corresponding policy and rule.

The AF network element may be an application control platform of a third party, or may be a device of an operator. The AF network element may provide services for a plurality of application servers. The AF network element is a function network element that can provide various business services, can interact with a core network via the NEF network element, and can interact with a policy management framework to perform policy management.

In addition, although not shown, a control plane function network element of the core network further includes a network exposure function (NEF) network element, a unified data management (UDM) network element, and a unified data repository (UDR) network element. The NEF network element is configured to: provide a framework, authentication, and an interface that are related to network capability exposure, and transfer information between a 5G system network function and another network function. The UDR network element is mainly configured to store user-related subscription data, policy data, structured data for exposure, and application data. The UDM network element may store subscription information of a user, to implement a backend similar to an HSS in 4G.

The terminal device in this disclosure is also referred to as UE, is a device having a wireless transceiver function, and may be deployed on the land, including an indoor or outdoor device, a hand-held device, a wearable device, or a vehicle-mounted device; may be deployed on the water surface (for example, in a steamship); or may be deployed in the air (for example, on an airplane, a balloon, or a satellite). The terminal device may be a mobile phone, a tablet computer (pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like.

The TSN is described below. The TSN usually includes a switching node (or bridge) and a data terminal (or end station). The data terminal and the switching node may form a network topology structure. The switching node may forward a packet by using transport information configured or created by the switching node, to forward the packet to the data terminal or another switching node.

Figure 2:
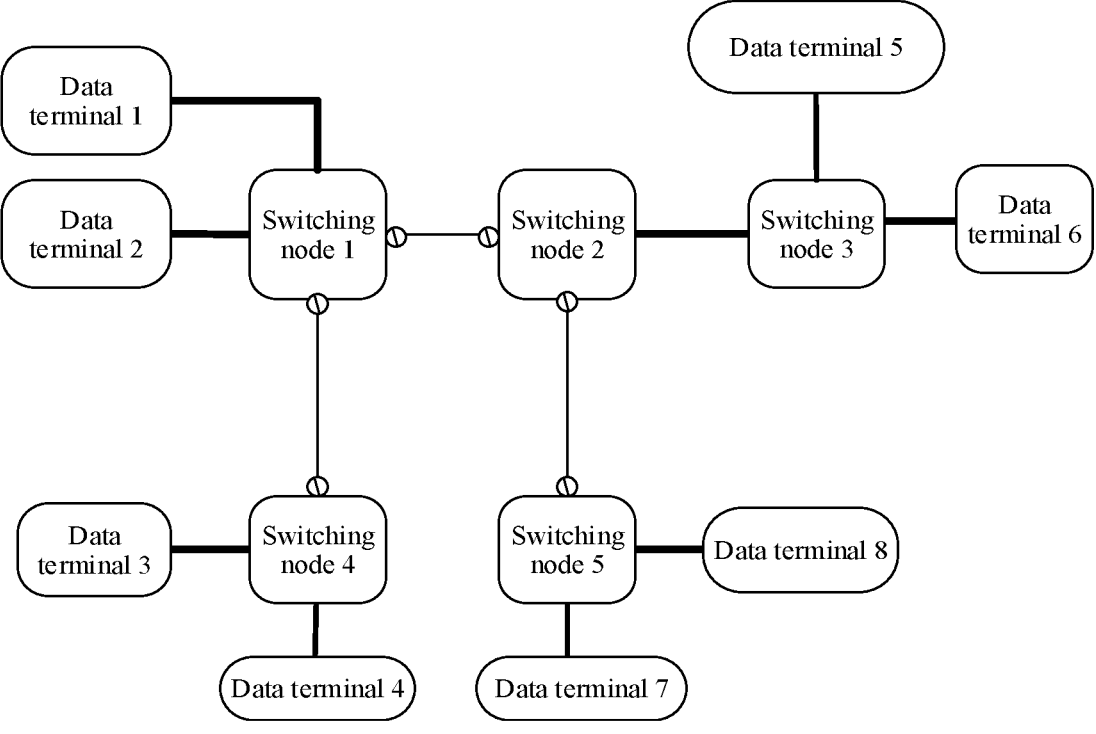
FIG. 2 is a schematic diagram of a network topology of TSN.

There are a plurality of network topology structures formed by the data terminal and the switching node. The network topology structure may be configured based on an application scenario. FIG. 2 is a schematic diagram of a simple network topology structure of TSN, where a plurality of data terminals and switching nodes are included.

The TSN is based on layer 2 transmission. A TSN standard defines behavior of the data terminal and the switching node and a scheduling manner in which the switching node forwards a data stream, to implement transmission with a reliable delay. The switching node in the TSN uses a destination media access control (MAC) address, an Internet Protocol (IP) address, or another packet feature of a packet as a stream identifier of a data stream, and performs resource reservation and scheduling planning based on a delay requirement of the data stream, to ensure reliability and a deterministic transmission delay according to a generated scheduling policy.

Data terminals may be classified into a transmit end (or talker) and a receive end (listener). A transmitter of a data stream is referred to as the transmit end (or talker), and a receiver of the data stream is referred to as the receive end (or listener). When the transmit end or the receive end sends a data stream requirement to the TSN, a TSN configuration is started. The TSN configuration includes a configuration of a switching node on a path from the transmit end to the receive end.

Optionally, the TSN may further include a configuration network element that is configured to implement the TSN configuration, for example, a centralized network configuration (CNC) network element or a centralized user configuration (CUC) network element.

Figure 3:
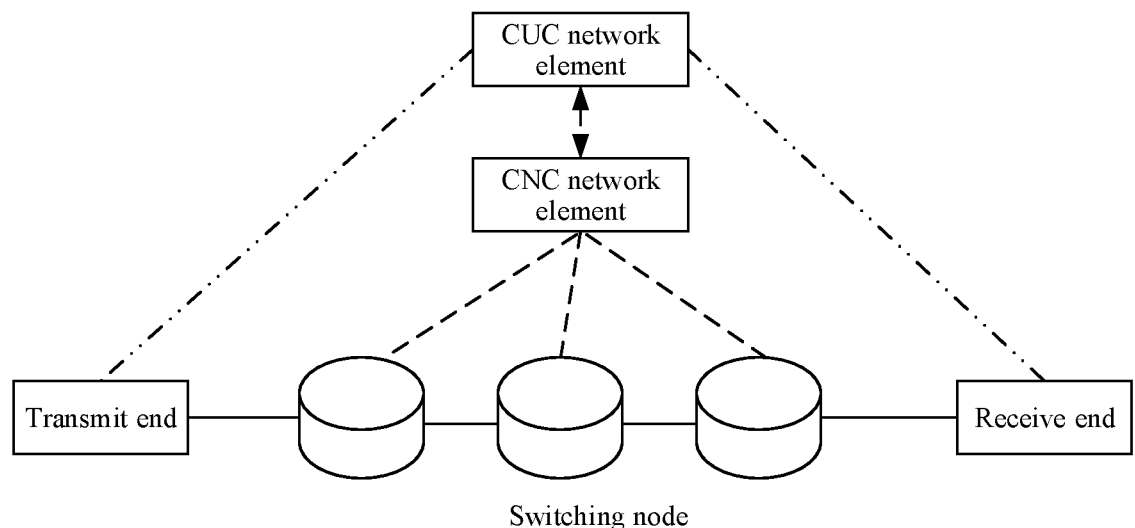
FIG. 3 is a schematic diagram of a centralized management architecture of TSN.

FIG. 3 is a schematic diagram of a centralized management architecture of TSN. The centralized management architecture is one of three architectures defined by 802.1qcc in a TSN standard. The centralized management architecture includes a transmit end, a receive end, a switching node, a CNC network element, and a CUC network element. It can be understood that a quantity of network elements and a network topology structure shown in FIG. 3 are merely examples. This is not limited in this embodiment of this disclosure.

The switching node reserves a resource for a data stream according to a definition in the TSN standard, and schedules and forwards a data packet.

The CNC network element is responsible for managing a topology of a TSN UP and information about the switching node, generating a transmission path of a data stream and transport information on a data terminal and each switching node based on a stream creation request provided by the CUC network element, and then delivering the transport information (information such as a stream identifier of the data stream, and identifiers of ingress and egress ports of the switching node when the switching node performs data transmission) on the switching node to a corresponding switching node.

The information about the switching node includes port information (such as information about the ingress port and the egress port for data transmission) and delay information (an internal transmission delay of the switching node) of the switching node.

In embodiments of this disclosure, a 5G system may be used as a virtual switching node, and information about the virtual switching node also includes port information and delay information of the virtual switching node.

Ports of the virtual switching node are classified into an ingress port and an egress port for transmitting uplink and downlink data. Ingress ports of the virtual switching node include a port on a UE side and a port on a UPF side, for example, a port for receiving uplink data on the UE side and a port for receiving downlink data on the UPF side. Egress ports of the virtual switching node include a port on the UE side and a port on the UPF side, for example, a port for sending downlink data on the UE side and a port (uplink port) for sending uplink data on the UPF side.

The CUC network element is configured to obtain a TSN capability of a data terminal, that is, obtain a quantity of ports of the data terminal, a MAC address of a port of each data terminal, and an 802.1 capability supported by each port. On this basis, the CUC network element may collect a stream creation request of the data terminal, after performing matching on a stream creation request of a transmit end and a stream creation request of a receive end, request the CNC network element to create the data stream, and confirm transport information generated by the CNC network element. The performing matching on a stream creation request of a transmit end and a stream creation request of a receive end means the following: the transmit end and the receive end each send a stream creation request to the CUC network element, where the stream creation request includes some information, for example, a destination MAC address of a requested data stream. The CUC network element performs matching on the stream creation request and a destination MAC address of a data stream requested by a different data terminal. If destination MAC addresses of data streams requested by two data terminals are the same, the data streams requested by the two data terminals are the same, the matching succeeds, and the data stream can be created. If destination MAC addresses of data streams requested by two data terminals are different, only the stream creation request of the transmit end or the receive end is available, and the data stream cannot be created.

It may be understood that the CNC network element and the CUC network element are control plane network elements in the TSN.

In addition to a function of forwarding data or a packet, the switching node in the TSN further has another function. For example, the switching node has a topology discovery function, determines a switch identifier and a port identifier of a switch, and supports a protocol such as a Link Layer Discovery Protocol (LLDP). In another example, the switching node may determine a transmission delay, and after detecting an internal transmission delay of the switching node, reports the detected transmission delay to the configuration network element.

Figure 4A:
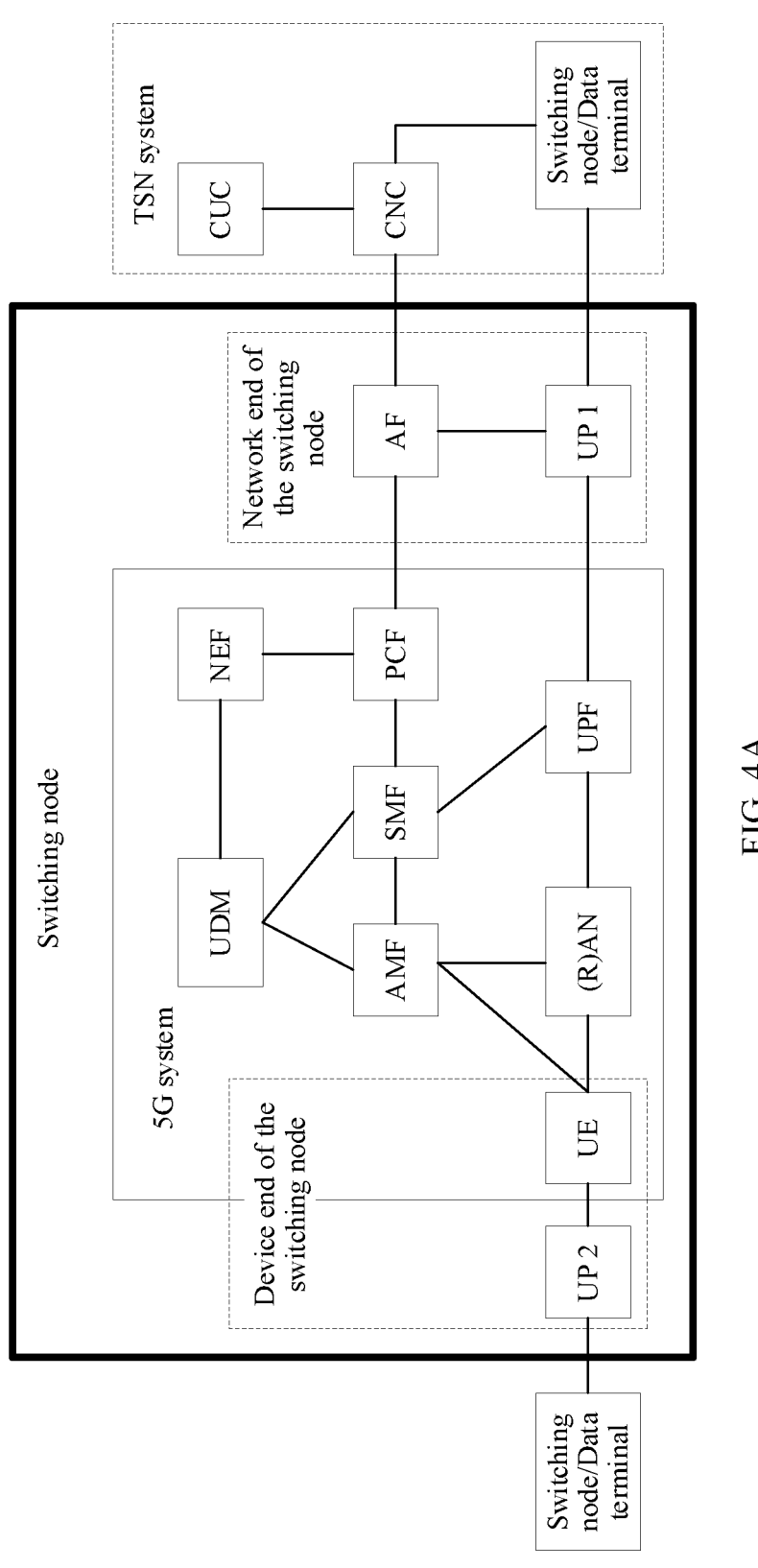
FIG. 4A is a schematic diagram of a network architecture according to an embodiment of this disclosure.

FIG. 4A is a schematic diagram of a network architecture to which this disclosure is applicable. The network architecture integrates a 5G system and TSN. Refer to the schematic diagram of the network architecture shown in FIG. 4A. A control plane of a TSN adaptation function is added to an AF network element, a UP 1 of the TSN adaptation function is added to a UPF network element, and a UP 2 of the TSN adaptation function is added to UE. The AF network element, the UPF network element, the UE, and the 5G system jointly form a logical switching node, that is, a virtual switching node, and the virtual switching node serves as a switching node in the TSN. Although the UPF and the UP 1, and the UE and the UP 2 are separately drawn in FIG. 4A, actually, the UP 1 and the UP 2 are logical functions of a UP TSN adaptation function, and the UP 1 may be deployed on the UPF network element, or the UP 1 may be an internal functional module of the UPF network element. Similarly, the UP 2 may be deployed on the UE, or the UP 2 may be an internal functional module of the UE.

The TSN adaptation function is to change a feature and information of a 5G network into information used by TSN, to communicate with a network element in the TSN through an interface defined in the TSN.

The AF network element is used as a connection node between the 5G system and the TSN. The AF network element may interact with a CNC network element in the TSN, and provide information about the logical switching node for the CNC network element based on a requirement of the switching node in the TSN. The UP of the TSN adaptation function provides necessary information for the control plane of the TSN adaptation function. In other words, the UP 1 may provide necessary information for the AF network element, for example, provide information about the switching node in the TSN, may identify TSN to which the CNC network element belongs, and may further provide a DNN of the TSN for a PCF network element in the 5G system.

It can be understood that, in this embodiment of this disclosure, a port on the UE side included in the virtual switching node may be a physical port of the UE or the UP 2, and may include one or more physical ports on the UE side. The port on the UE side may be at a granularity of UE. To be specific, one UE corresponds to one port, and different UEs correspond to different ports. Alternatively, the port on the UE side may be at a granularity of a PDU session. To be specific, one session corresponds to one port, and different sessions correspond to different ports. Alternatively, the port on the UE side may be at a granularity of TSN. To be specific, one TSN domain corresponds to one or more ports, and one virtual port cannot correspond to different TSN domains.

A port on the UPF side included in the virtual switching node is a physical port of the UPF or the UP 1. One UPF or UP 1 may include a plurality of physical ports. One physical port of the UPF or the UP 1 corresponds to one virtual switching node. However, one virtual switching node may include a plurality of physical ports of one UPF or UP 1, or may include a plurality of physical ports of a plurality of UPFs or UPs 1.

Figure 4B:
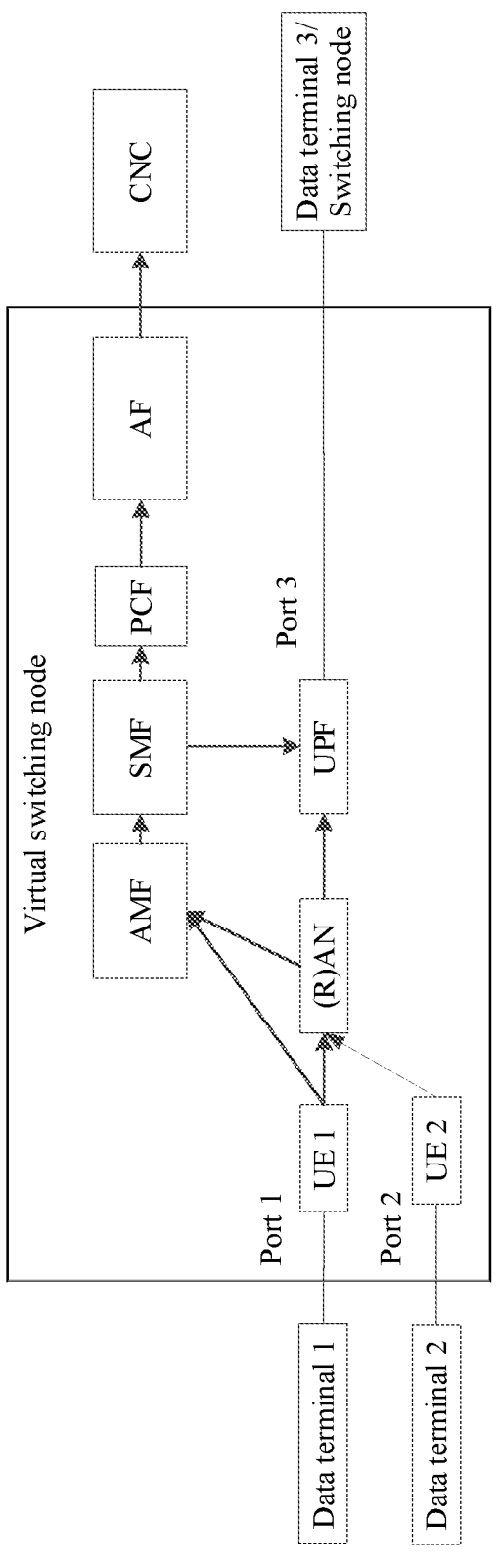
FIG. 4B is a schematic diagram of a network architecture according to an embodiment of this disclosure.

FIG. 4B is a schematic diagram of another network architecture to which this disclosure is applicable. In FIG. 4B, a UP of a TSN adaptation function is deployed on UE or a UP of a TSN adaptation function is an internal functional module of UE, that is, the UP 2 in FIG. 4A. The UP 2 is configured to obtain port information of the UE, and send the port information of the UE to the AF network element via a control plane.

It can be understood that in the network frameworks shown in FIG. 4A and FIG. 4B, the SMF network element may interact with the AF network element through the PCF network element or the NEF network element, or may directly interact with the AF network element. This is not limited in embodiments of this disclosure.

In FIG. 4B, the AF network element is a logical network element, and may be a component in another logical network element (for example, a component in the SMF network element), or may be another control plane function network element. A name of the AF network element is not limited herein. In FIG. 4B, a virtual switching node includes two UEs, UE 1 and UE 2. A data terminal 1 is connected to a port (for example, a port 1) on a side of the UE 1, and a data terminal 2 is connected to a port (for example, a port 2) on a side of the UE 2. The UPF network element is connected to another data terminal (for example, a data terminal 3) or switching node through a port (for example, a port 3) on the UPF side. It can be understood that, in FIG. 4B, an example in which a device connected to the UE side is a data terminal is used. Actually, the UE side may also be connected to a switching node. This is not limited in this embodiment of this disclosure.

In a network architecture in which the 5G system and the TSN are integrated, a data stream is transmitted in a TSN network according to a definition of the TSN, and is transmitted by using a transmission mechanism of the 5G system when passing through a 5G UP. In the 5G system, a data stream sent from a 5G network side to a UE side is a downlink data stream. The downlink data stream may be carried in a session of UE. The downlink data stream may be a QoS flow in the session of the UE. A data stream sent from the UE side to the 5G network side is an uplink data stream. The uplink data stream may be carried in a session of the UE. The uplink data stream may be a QoS flow in the session of the UE. For ease of differentiation, the downlink data stream may be referred to as a downlink stream, the uplink data stream may be referred to as an uplink stream.

In this embodiment of this disclosure, the data stream is a data stream between UEs. The data stream includes the downlink stream between the 5G network side to the UE side and the uplink stream between the UE side to the 5G network side. The uplink stream and the downlink stream each are carried in a session of the UE. In this embodiment of this disclosure, the session carrying the uplink stream is a first session, and the session carrying the downlink stream is a second session.

It can be understood that in the network architectures shown in FIG. 4A and FIG. 4B, only a network architecture in which the 5G system and the TSN are integrated is used as an example. In the following descriptions, a communication method in embodiments of this disclosure is described based on the schematic diagrams of the network architectures shown in FIG. 4A and FIG. 4B. Actually, integration of another communication system and the TSN is not limited in embodiments of this disclosure. When the other communication system is virtualized as a switching node in the TSN, a network element (for example, a network element that can implement a function of a terminal device, a session management network element, an access and mobility management network element, or the like in embodiments of this disclosure) that can implement a related function is disposed in the other communication system, to ensure that the other communication system has a function of the switching node. For an implementation, refer to embodiments of this disclosure.

The network architectures shown in FIG. 4A and FIG. 4B are used as an example to describe a manner of configuring transport information for a data stream between UE and a DN side in a network architecture in which the 5G system interworks with the TSN.

The AF network element may obtain the transport information for the data stream from the CNC network element. The transport information for the data stream includes a stream identifier of the data stream, an identifier of the ingress port of the data stream, and an identifier of the egress port of the data stream. The identifier of the ingress port identifies a port for the virtual switching node to receive the data stream, and the ingress port may be a port on the UE side or a port on the UPF side. The identifier of the egress port identifies a port for the virtual switching node to send the data stream, and the egress port may be a port on the UE side or a port on the UPF side. The AF network element may store an association relationship between an identifier or identifiers of one or more ports on the UE side and a protocol data unit (PDU) session. After receiving the transport information for the data stream, the AF network element may determine a corresponding PDU session Y based on the identifier of the egress port of the data stream or the identifier of the ingress port of the data stream in the transport information for the data stream. Then, the AF network element sends an identifier of the PDU session Y (for example, a MAC address corresponding to the PDU session Y) and a destination MAC address of the data stream to the PCF network element. Optionally, the AF network element may alternatively send the identifier of the egress port and/or the identifier of the ingress port of the data stream. Optionally, the AF network element may alternatively send a data stream direction (an uplink data stream or a downlink data stream). The AF network element triggers the PCF network element to initiate a process of creating/modifying a PCC rule for the PDU session Y, to create or modify a quality of service (QoS) flow in the PDU session; and sends related information (information such as a 5QI of the QoS flow) of a created or modified PCC rule to the SMF network element. The SMF network element creates a forwarding rule for the PDU session Y based on the related information of the PCC rule.

Currently, in the network architecture in which the 5G system interworks with the TSN, after receiving an indication from the AF network element, the PCF network element creates/modifies a QoS flow from the UE to the UPF network element in a corresponding PDU session, that is, creates an uplink stream or a downlink stream. However, for a data stream between UEs, because both an uplink stream and a downlink stream are involved, there is no manner for creating the data stream between the UEs.

Therefore, an embodiment of this disclosure provides a communication method, to creating a data stream between UEs. In this embodiment of this disclosure, after receiving transport information that is for a data stream and that carries information about an ingress port for the data stream and information about an egress port for the data stream, an application function network element may determine, based on the transport information for the data stream, that the data stream is a data stream between terminal devices, and then trigger a core network device to configure a PCC rule for a first session corresponding to the information about the ingress port and configure a PCC rule for a second session corresponding to the information about the egress port. Then, after receiving a forwarding rule creation request from a policy control function network element, a session management network element determines, based on indication information (for example, first indication information or second indication information) carried in the forwarding rule, that the data stream is a data stream between the terminal devices, configures the forwarding rule for the first session to local forwarding and configures the forwarding rule for the second session to local forwarding based on the forwarding rule creation request, to create the data stream between the terminal devices.

Figure 5:
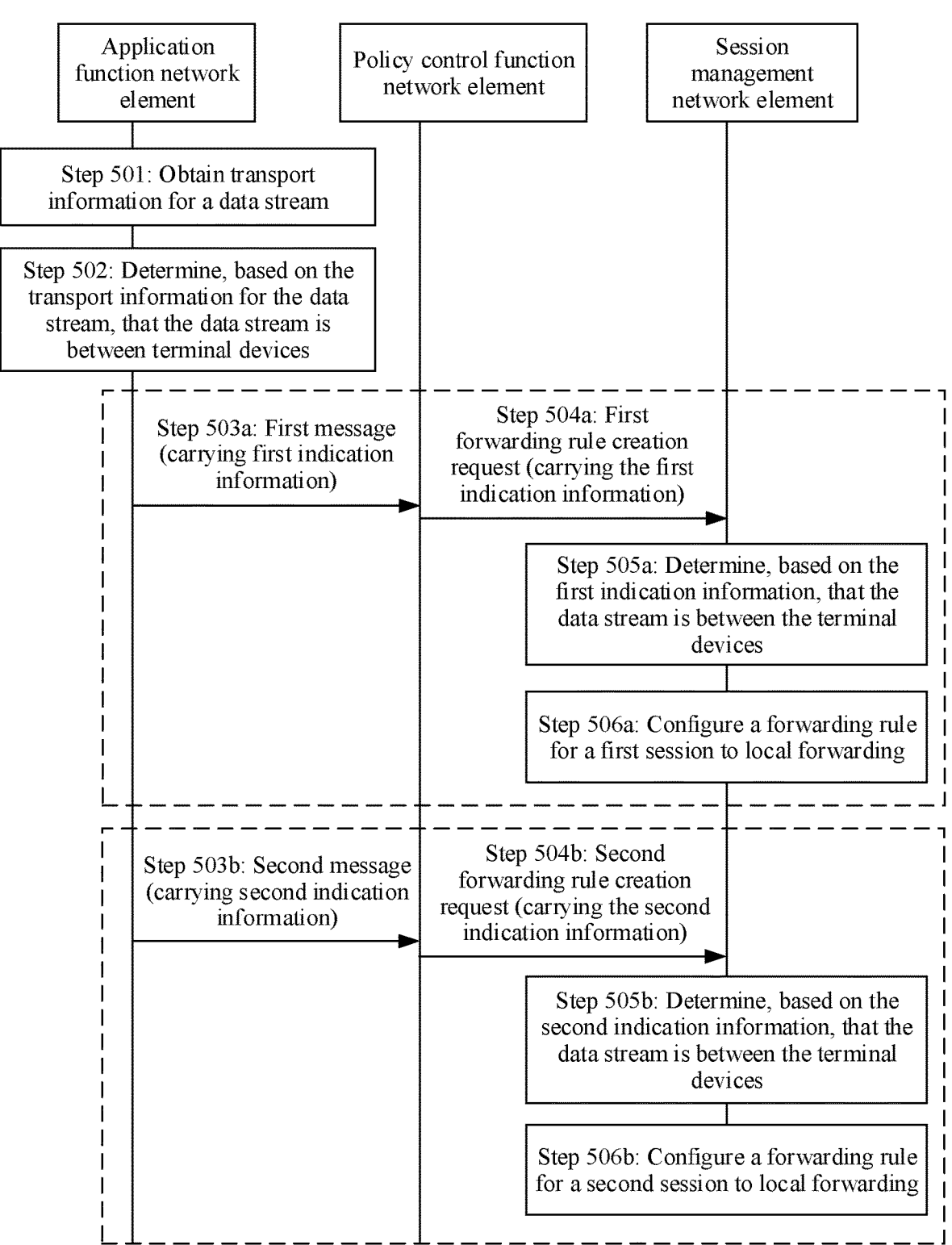
FIG. 5 to FIG. 11B each are a schematic diagram of a communication method according to an embodiment of this disclosure.

A communication method provided in an embodiment of this disclosure is described below with reference to the accompanying drawings. Refer to FIG. 5. The method includes the following steps.

Step 501: An application function network element obtains transport information for a data stream, where the transport information for the data stream includes information about an ingress port for the data stream and information about an egress port for the data stream.

A manner in which the application function network element obtains the transport information for the data stream is not limited in this disclosure. For example, after receiving a stream creation request used to request to create the data stream, a centralized network configuration network element generates a transmission path of the data stream and transport information that is for the data stream and that is on a data terminal and each switching node, and then sends transport information that is for the data stream and that is on a virtual switching node on which the application function network element is located to the application function network element. In another example, the transport information for the data stream may be preconfigured in the application function network element. In another example, the application function network element may obtain the transport information for the data stream from another network.

The information about the ingress port for the data stream indicates an ingress through which the data stream enters the virtual switching node. The information about the ingress port for the data stream may include a part or all of the following information: an identifier of the ingress port of the data stream and an identifier of a first session. The first session is a session corresponding to the information about the ingress port, and is a session carrying (an uplink stream in) the data stream.

The information about the egress port for the data stream indicates an egress through which the data stream flows out of the virtual switching node. The information about the egress port for the data stream may include a part or all of the following information: an identifier of the egress port of the data stream and an identifier of a second session. The second session is a session corresponding to the information about the egress port, and is a session carrying (a downlink stream in) the data stream.

Step 502: The application function network element determines, based on the transport information for the data stream, that the data stream is a data stream between terminal devices.

For different composition of information included in the transport information for the data stream, manners in which the application function network element determines, based on the transport information for the data stream, that the data stream is a data stream between the terminal devices are also different. The following separately describes the manners in which the application function network element determines that the data stream is a data stream between the terminal devices.

Manner 1: The information about the ingress port for the data stream includes the identifier of the ingress port of the data stream, and the information about the egress port for the data stream includes the identifier of the egress port of the data stream.

The application function network element determines that the identifier of the ingress port and the identifier of the egress port are respectively associated with the first session and the second session. For example, the application function network element may determine, based on an association relationship between an identifier of a port on a terminal device side and a session and based on the identifier of the ingress port and the identifier of the egress port, that the identifier of the egress port and the identifier of the ingress port respectively correspond to sessions, to further determine that the data stream is a data stream between the terminal devices. The association relationship between the identifier of the port on the terminal device side and the session may be locally stored by the application function network element, or may be obtained by the application function network element from another network element (for example, a session management network element). A manner in which the application function network element obtains the association relationship between the identifier of the port on the terminal device side and the session is not limited in this embodiment of this disclosure.

Optionally, if the application function network element determines that the identifier of the ingress port is an identifier of a port on a side of a first terminal device and the identifier of the egress port is an identifier of a port on a side of a second terminal device, the data stream is from the first terminal device to the second terminal device. In other words, the first session is a session of the first terminal device, the second data is a session of the second terminal device, and the data stream enters a port on the side of the first terminal device and flows out through a port on the side of the second terminal device.

A manner in which the application function network element determines that the identifier of the ingress port is the identifier of the port on the side of the first terminal device and the identifier of the egress port is the identifier of the port on the side of the second terminal device is not limited in this embodiment of this disclosure. For example, based on a correspondence between a terminal device and a port, the application function network element may determine that the identifier of the ingress port is the identifier of the port on the side of the first terminal device and determine that the identifier of the egress port is the identifier of the port on the side of the second terminal device. The correspondence between the terminal device and the port may be locally stored by the application function network element, or may be obtained by the application function network element from another network element (for example, the session management network element). A manner in which the application function network element obtains the association relationship between the identifier of the port on the terminal device side and the session is not limited in this embodiment of this disclosure.

Manner 2: The information about the ingress port for the data stream includes the identifier of the first session, and the information about the egress port for the data stream includes the identifier of the second session.

The application function network element directly determines, on the basis that the information about the ingress port includes the identifier of the first session and the information about the egress port includes the identifier of the second session, that the data stream is a data stream between the terminal devices.

Then, the application function network element may trigger a policy control function network element to configure a PCC rule for the first session and a PCC rule for the second session.

When determining that the data stream is a data stream between the terminal devices, the application function network element may trigger the policy control function network element to initiate two PCC rule creation/modification processes: a process of creating/modifying the PCC rule for the first session and a process of creating/modifying the PCC rule for the second session.

A sequence in which the application function network element indicates the policy control function network element to configure and initiate the two PCC rule creation/modification processes is not limited in this embodiment of this disclosure. In this embodiment of this disclosure, an example in which the application function network element first triggers the policy control function network element to initiate the process of creating/modifying the PCC rule for the first session, and then triggers the policy control function network element to initiate the process of creating/modifying the PCC rule for the second session is used for description.

It can be understood that configuring the PCC rule for the first session is actually configuring a PCC rule for a QoS flow (namely, an uplink stream) in the first session, and configuring the PCC rule for the second session is actually configuring a PCC rule for a QoS flow (namely, a downlink stream) in the second session.

Step 503*a*: The policy control function network element receives a first message of the application function network element, where the first message includes information for configuring the PCC rule for the first session and first indication information. The first indication information indicates that the data stream is a data stream between the terminal devices.

The information for configuring the PCC rule for the first session includes but is not limited to: a stream identifier of the data stream, first delay information, an identifier of a port corresponding to the first session, the identifier of the first session, a direction of the data stream, and an identifier of a port corresponding to the second session.

The first delay information indicates a transmission delay of forwarding a packet between the port on the side of the first terminal device (in this embodiment of this disclosure, the port on the side of the first terminal device is an ingress port of the data stream) and a UP network element when the packet of the data stream is transmitted by using the first session of the first terminal device. Therefore, the first delay information may also be referred to as delay information of the first session or delay information of the first terminal device.

The first session may correspond to the port on the side of the first terminal device, and the identifier of the port corresponding to the first session may be an identifier of the port on the side of the first terminal device.

A manner in which the first indication information indicates that the data stream is a data stream between the terminal devices is not limited in this embodiment of this disclosure. For example, the first indication information may use a direct indication manner. For example, the first indication information may be a pre-agreed character that can indicate that the data stream is a data stream between the terminal devices. In another example, the first indication information may use an indirect indication manner. The first indication information may include the identifier of the second session or the identifier of the egress port of the data stream.

Before the application function network element sends the first message to the policy control function network element, the application function network element obtains the first delay information. A manner in which the application function network element obtains the first delay information is not limited in this embodiment of this application. For example, the application function network element may directly obtain the first delay information from another network element. The application function network element may alternatively first obtain information (for example, a residence delay of the first terminal device, and a packet delay budget (PDB) between the first terminal device and the UP network element) for calculating the first delay information, and then calculate the first delay information by using the information for calculating the first delay information. The other network element may be the session management network element (for example, the session management network element sends, via the policy control function network element, the first delay information or the information for calculating the first delay information), or may be the policy control function network element.

The information for calculating the first delay information includes the residence delay of the first terminal device and the PDB between the first terminal device and the UP network element. The residence delay of the first terminal device is a transmission delay of forwarding a packet between the first terminal device and a UP 2 corresponding to the first terminal device. The PDB indicates a maximum delay budget for transmitting a data stream between UP nodes (including UE, an access network device, and a UPF network element).

It can be understood that the first session may correspond to one or more ports on the side of the first terminal device (for example, a plurality of ports of the UP 2). When there are a plurality of ports on the side of the first terminal device, the application function network element may obtain a plurality of pieces of first delay information or information for calculating the plurality of pieces of first delay information in advance. Each first transmission delay may be a transmission delay of forwarding a packet between one port on the side of the first terminal device and the UP network element.

The policy control function network element may configure the PCC rule for the first session based on the first message. That the policy control function network element configures the PCC rule for the first session includes: determining a 5QI of an uplink stream in the data stream based on the first delay information.

Step 504a: After configuring the PCC rule for the first session, the policy control function network element may send a first forwarding rule creation request to the session management network element, where the first forwarding rule creation request indicates to create a forwarding rule for the first session, and the first forwarding rule creation request includes the first indication information.

Step 505a: After receiving the first forwarding rule creation request, the session management network element may determine, based on the first indication information, that the data stream is a data stream between the terminal devices.

When indication manners of the first indication information are different, manners in which the session management network element determines that the data stream is a data stream between the terminal devices are also different.

If the first indication information uses the direct indication manner, the session management network element may directly determine, based on the first indication information, that the data stream is a data stream between the terminal devices.

If the first indication information uses the indirect indication manner, when the first indication information includes the identifier of the second session, the session management network element may determine that an egress of the data stream is a terminal device, in other words, the data stream is a data stream between the terminal devices. When the first indication information includes the identifier of the egress port of the data stream, the session management network element may determine, based on an association relationship between an identifier of a port on a terminal device side and a session, that the identifier of the egress port corresponds to one session, to further determine that the data stream is a data stream between the terminal devices.

Step 506a: The session management network element configures the forwarding rule for the first session to local forwarding.

For an uplink stream, local forwarding means that a forwarding policy in the forwarding rule for the first session is configured to sending of a packet of the uplink stream to a local forwarding module. For example, the session management network element may configure a destination interface in a forwarding action rule (FAR) to "an internal interface" (where a specific name of the internal interface is not limited herein).

So far, the process of creating/modifying the PCC rule for the first session is completed.

Step 503b: The policy control function network element receives a second message of the application function network element, where the second message includes information for configuring the PCC rule for the second session and second indication information. The second indication information indicates that the data stream is a data stream between the terminal devices.

The information for configuring the PCC rule for the second session includes but is not limited to: a stream identifier of the data stream, second delay information, an identifier of a port corresponding to the second session, the identifier of the second session, a direction of the data stream, and an identifier of a port corresponding to the first session.

The second delay information indicates a transmission delay of forwarding a packet between the port on the side of the second terminal device (in this embodiment of this disclosure, the port on the side of the second terminal device is an ingress port of the data stream) and a UP network element when the packet of the data stream is transmitted by using the second session of the second terminal device. Therefore, the second delay information may also be referred to as delay information of the second session or delay information of the second terminal device.

The second session may correspond to the port on the side of the second terminal device, and the identifier of the port corresponding to the second session may be an identifier of the port on the side of the second terminal device.

A manner in which the second indication information indicates that the data stream is a data stream between the terminal devices is not limited in this embodiment of this disclosure. For example, the second indication information may use a direct indication manner. For example, the second indication information may be a pre-agreed character that can indicate that the data stream is a data stream between the terminal devices. In another example, the second indication information may use an indirect indication manner. The second indication information may include the identifier of the first session or the identifier of the egress port of the data stream.

Before the application function network element sends the second message to the policy control function network element, the application function network element obtains the second delay information. A manner in which the application function network element obtains the second delay information is the same as the manner in which the application function network element obtains the first delay information. For details, refer to the foregoing content. Details are not described herein again.

It can be understood that the second session may correspond to one or more ports on the side of the second terminal device (for example, a plurality of ports of the UP 2). When there are a plurality of ports on the side of the second terminal device, the application function network element may obtain a plurality of pieces of second delay information or information for calculating the plurality of pieces of second delay information in advance. Each second transmission delay may be a transmission delay of forwarding a packet between one port on the side of the second terminal device and the UP network element.

The policy control function network element may configure the PCC rule for the second session based on the second message. That the policy control function network element configures the PCC rule for the second session includes: determining a 5QI of a downlink stream in the data stream based on the second delay information.

Step 504*b*: After configuring the PCC rule for the second session, the policy control function network element may send a second forwarding rule creation request to the session management network element, where the second forwarding rule creation request indicates to create a forwarding rule for the second session, and the second forwarding rule creation request includes the second indication information.

Step 505*b*: After receiving the second forwarding rule creation request, the session management network element may determine, based on the second indication information, that the data stream is a data stream between the terminal devices. A manner in which the session management network element determines, based on the second indication information, that the data stream is a data stream between the terminal devices is the same as the manner in which the session management network element determines, based on the first indication information, that the data stream is a data stream between the terminal devices. For details, refer to the foregoing content. Details are not described herein again.

Step 506*b*: The session management network element configures the forwarding rule for the second session to local forwarding.

For a downlink stream, local forwarding means that a forwarding policy in the forwarding rule for the second session is configured to matching of a packet from a local forwarding module. For example, the session management network element may configure a source interface in a packet detection rule (PDR) to an "internal interface" (where a specific name of the internal interface is not limited herein).

So far, the process of creating/modifying the PCC rule for the second session is completed.

It can be understood that when performing step 503*a* and step 503*b*, the application function network element obtains the first delay information and the second delay information.

A sequence in which the application function network element obtains the first delay information and the second delay information is not limited in this embodiment of this disclosure. The following uses an example in which the application function network element first obtains the first delay information for description.

After the first terminal device goes online, the session management network element may establish the first session for the first terminal device. When establishing the first session, the session management network element determines the delay information of the first terminal device, and sends the delay information of the first terminal device (via the policy control function network element) to the application function network element.

Alternatively, the session management network element may send information for calculating the delay information of the first terminal device (via the policy control function network element) to the application function network element.

Then, after the second terminal device that can communicate with the first terminal device goes online, the session management network element may establish the second session for the second terminal device. When establishing the second session, the session management network element determines the delay information of the second terminal device, and may send the delay information of the second terminal device or the information for calculating the delay information of the second terminal device to the application function network element.

For example, when the session management network element determines that the first terminal device and the second terminal device can communicate with each other, the session management network element may send the delay information of the second terminal device (or the information for calculating the delay information of the second terminal device) and third indication information to the application function network element. The third indication information indicates that the port on the side of the first terminal device and the port on the side of the second terminal device are a port pair, in other words, the first terminal device and the second terminal device can communicate with each other.

An indication manner of the third indication information is not limited in this embodiment of this disclosure. For example, a direct indication manner may be used. The third indication information is a character indicating that the port on the side of the first terminal device and the port on the side of the second terminal device are the port pair. In another example, the third indication information may alternatively use an indirect indication manner. For example, the third indication information may be identifier information of the first terminal device, may be an identifier of the first terminal device, or may be an identifier of a port on the side of the first terminal device.

The application function network element receives the delay information of the second terminal device (or the information for calculating the delay information of the second terminal device) and the third indication information, and determines, based on the third indication information, that the first terminal device and the second terminal device can communicate with each other. The application function network element may report a transmission delay (third delay information for short in this embodiment of this disclosure) between the port on the side of the first terminal device and the port on the side of the second terminal device to a device in TSN. The third delay information is determined by the application function network element based on a sum value of the delay information of the first terminal device and the delay information of the second terminal device.

Optionally, the session management network element may not send the third indication information when sending the second delay information. The application function network element may determine, based on group information, that the first terminal device and the second terminal device can communicate with each other. If determining that the first terminal device and the second terminal device can communicate with each other, the application function network element may report the transmission delay between the port on the side of the first terminal device and the port on the side of the second terminal device to the device in the TSN.

In the foregoing description, the example in which the application function network element first obtains the first delay information is used. A case in which the application function network element first obtains the second delay information is similar to a case in which the application function network element first obtains the first delay information. To be specific, the session management network element may send the first delay information and fourth indication information (for example, identifier information of the second terminal device, where the identifier information of the second terminal device is similar to the identifier information of the first terminal device, reference may be made to the foregoing description of the identifier information of the first terminal device, and details are not described herein again) to the application function network element. The application function network element determines, based on the identifier information of the second terminal device, that the first terminal device and the second terminal device can communicate with each other, and further determines and reports the third delay information.

It can be understood that the identifier information of the first terminal device and the identifier information of the second terminal essentially have an indication function, and indicate that the first terminal device and the second terminal device can communicate with each other. Another manner of indicating that the first terminal device and the second terminal device can perform communication is not limited in this embodiment of this disclosure. The identifier information of the first terminal device and the identifier information of the second terminal are merely examples for description.

In a possible implementation, alternatively, the application function network element directly obtains the third delay information. A manner in which the application function network element obtains the third delay information is not limited in this embodiment of this disclosure. The application function network element may obtain the third delay information or information for calculating the third delay information from another device. The information for calculating the third delay information includes a residence delay of the first terminal device, a PDB between the first terminal device and the UP network element, a residence delay of the second terminal device, and a PDB between the second terminal device and the UP network element. Alternatively, after obtaining the first delay information and the second delay information, the application function network element may determine the third delay information based on the first delay information and the second delay information.

After obtaining the third delay information, the application function network element may send the third delay information to the TSN.

Optionally, when reporting the third delay information, the application function network element may further send the identifier of the port on the side of the first terminal device and the identifier of the port on the side of the second terminal device, to indicate that the third delay information is a transmission delay between the first terminal device and the second terminal device.

Figure 6A:
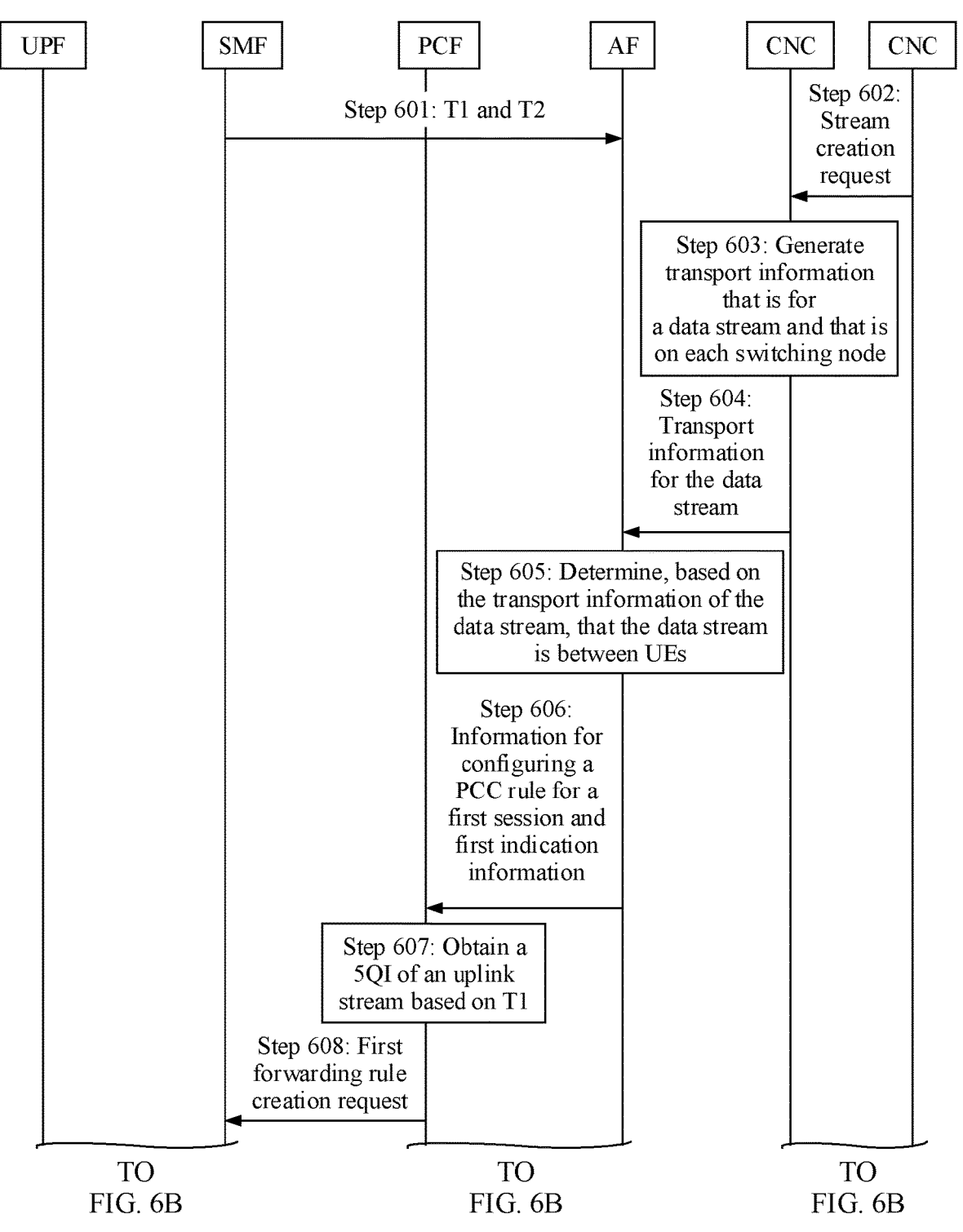
Figure 6B:
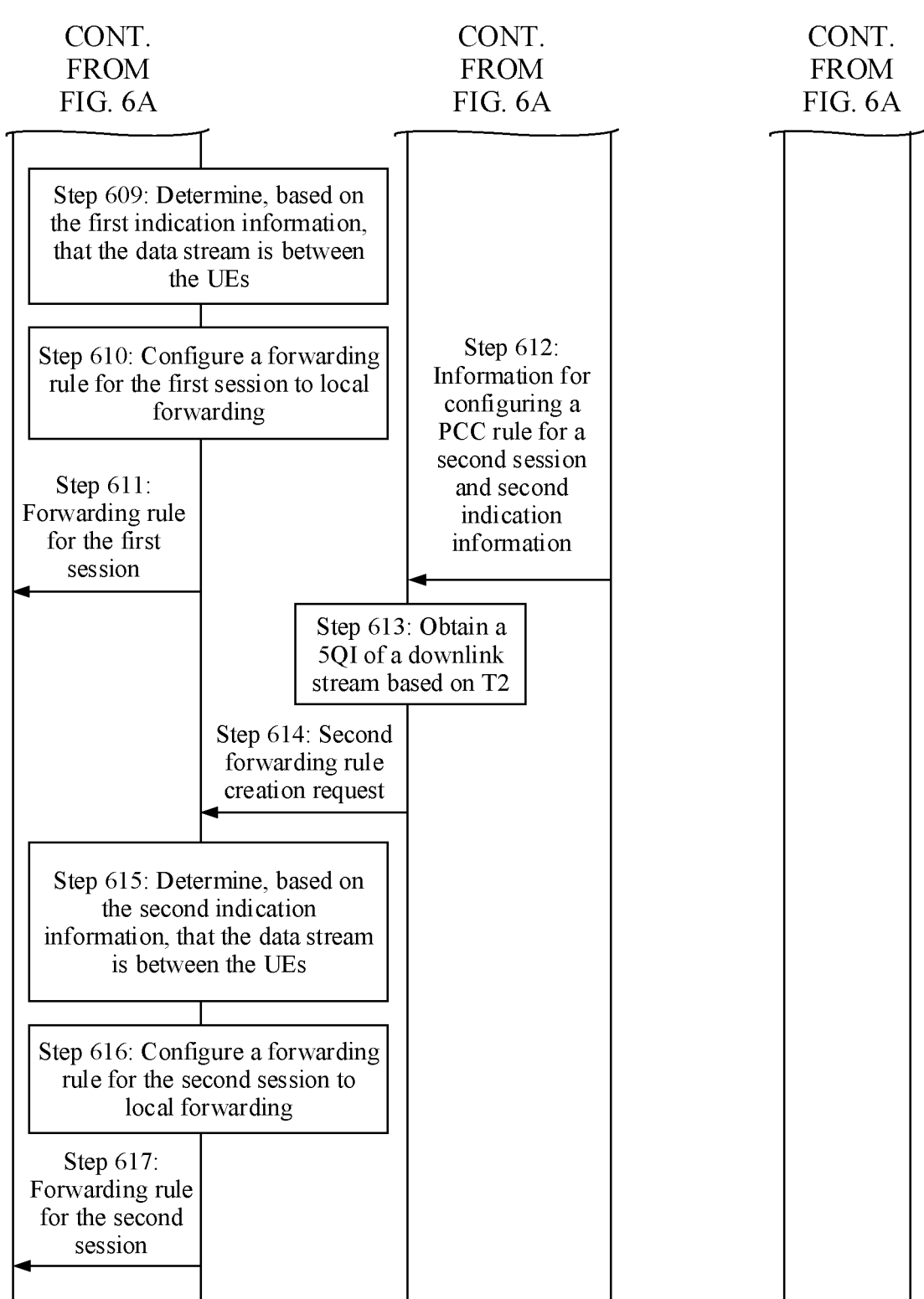

Based on the network architecture shown in FIG. 4B, the embodiment shown in FIG. 5 is further described by using an example in which the application function network element is an AF network element, the session management network element is an SMF network element, the policy control function network element is a PCF network element, and the centralized network configuration network element is a CNC network element. As shown in FIG. 6A and FIG. 6B, the method includes the following steps.

Step 601: The AF network element obtains, from the SMF network element, delay information T1 between UE 1 and a DN and delay information T2 between UE 2 and the DN. The delay information T1 indicates a transmission delay between a port on a side of the UE 1 and the DN, and the delay information T2 indicates a transmission delay between a port on a side of the UE 2 and the DN.

Optionally, the AF network element may further obtain, from the SMF network element, delay information T between the port on the side of the UE 1 and the port on the side of the UE 2.

In this embodiment of this disclosure, an example in which the AF network element obtains T1, T2, or T from the SMF network element is merely used for description. The AF network element may obtain T1, T2, or T from another network element. This is not limited in this embodiment of this disclosure.

The SMF network element may directly send T1, T2, or T to the AF network element, or may send information for calculating T1, T2, or T to the AF network element.

The information for calculating T1 includes a part or all of the following information: a residence delay between the UE 1 and the UP 2, and a PDB between the UE 1 and the UPF network element. The information for calculating T2 includes a part or all of the following information: a residence delay between the UE 2 and the UP 2, and a PDB between the UE 2 and the UPF network element. The information for calculating T includes a part or all of the following information: the residence delay between the UE 1 and the UP 2, the PDB between the UE 1 and the UPF, the residence delay between the UE 2 and the UP 2, and the PDB between the UE 2 and the UPF.

A manner in which the SMF network element obtains the residence delay between the UE 1 and the UP 2, the PDB between the UE 1 and the UPF, the residence delay between the UE 2 and the UP 2, and the PDB between the UE 2 and the UPF is not limited in this embodiment of this disclosure. For example, the residence delay between the UE 1 and the UP 2 may be sent by the UP 2 or the UE 1 to the SMF network element in a process of creating a PDU session by the UP 2 or the UE 1, or may be sent by the UP 2 or the UE 1 to the SMF network element after the UP 2 or the UE 1 establishes a PDU session. Similarly, the residence delay between the UE 2 and the UP 2 may be sent by the UP 2 or the UE 2 to the SMF network element in a process of creating a PDU session by the UP 2 or the UE 2, or may be sent by the UP 2 or the UE 2 to the SMF network element after the UP 2 or the UE 2 creates a PDU session.

In another example, the PDB between the UE 1 and the UPF and the PDB between the UE 2 and the UPF may be locally stored by the SMF network element, or may be obtained by the SMF network element from the PCF network element.

In this embodiment of this disclosure, an example in which the SMF network element sends the PDB between the UE 1 and the UPF and the PDB between the UE 2 and the UPF to the AF network element is used for description. In a possible implementation, the PDB between the UE 1 and the UPF and the PDB between the UE 2 and the UPF may alternatively be directly sent by the PCF network element to the AF network element.

It can be understood that when the AF network obtains T1 and T2, the AF network element may calculate T based on a sum of T1 and T2, to obtain T. In this way, the AF network element can calculate T without a need of obtaining T or the information for calculating T from the SMF network element.

In a possible implementation, after obtaining T or obtaining T through calculation based on T1 or T2, the AF network element reports the delay information T between the UE 1 and the UE 2 to the CNC network element.

A prerequisite for the AF network element to report the delay information T between the UE 1 and the UE 2 is that the AF network element can determine that the UE 1 and the UE 2 can communicate with each other. There are many manners in which the AF network element can determine that the UE 1 and the UE 2 can communicate with each other. For example, the AF network element stores information about a group and a group member. The AF network element determines, by querying the information about a group and a group member, that the UE 1 and the UE 2 belong to a same group, to further determine that the UE 1 and the UE 2 can communicate with each other.

In another example, the SMF network element may send, to the AF network element, information used to indicate that the UE 1 and the UE 2 can communicate with each other. For example, if the SMF network element determines that the UE 2 and the UE 1 are allowed to communicate (for example, the SMF network element finds, based on the locally stored information about a group and a group member, that the UE 1 and the UE 2 belong to a same group), the port on the side of the UE 1 and the port on the side of the UE 2 may form a port pair. When sending T2 or the information for calculating T2 to the AF network element, the SMF network element may further send an identifier of a port of the UE 1 to the AF network element.

When the AF network element receives T2 or the information for calculating T2, if receiving the identifier of the port of the UE 1, the AF network element may determine that the port on the side of the UE 1 and the port on the side of the UE 2 can form the port pair, in other words, determine that the UE 1 and the UE 2 can communicate with each other. The AF network element may determine T based on the received T1 (or the information for calculating T1) and T2 (or the information for calculating T2), and report T to the CNC network element.

Similarly, when sending T1 or the information for calculating T1 to the AF network element, the SMF network element may further send an identifier of a port of the UE 2 to the AF network element.

When the AF network element receives T1 or the information for calculating T1, if receiving the identifier of the port of the UE 2, the AF network element determines that the UE 1 and the UE 2 can communicate with each other. The AF network element may determine T based on the received T2 (or the information for calculating T2) and T1 (or the information for calculating T1), and report the delay information T between the UE 1 and the UE 2 to the CNC network element.

Step 602: When determining that a data stream is to be created, a CUC network element sends a stream creation request to the CNC network element. The stream creation request includes an identifier of a data terminal of the data stream, and the data terminal of the data stream includes a data terminal that initiates the data stream and a data terminal that receives the data stream. Optionally, the stream creation request may further include a stream identifier of the data stream.

Step 603: After receiving the stream creation request, the CNC network element generates a transmission path of the data stream and transport information that is for the data stream and that is on the data terminal and each switching node.

Step 604: If the transmission path of the data stream includes a virtual switching node, the CNC network element sends the transport information for the data stream on the virtual switching node to the AF network element in the virtual switching node. The transport information for the data stream includes information about an ingress port for the data stream and information about an egress port for the data stream.

The information about the ingress port for the data stream includes an identifier of the ingress port of the data stream, and the identifier of the ingress port may be the identifier of the port on the side of the UE 1 (or on a side of the UP 2). The information about the egress port for the data stream includes an identifier of the egress port of the data stream, and the identifier of the egress port may be the identifier of the port on the side of the UE 2 (or the side of the UP 2).

In this embodiment of this disclosure, an example in which the AF network element obtains the transport information for the data stream from the CNC network element is used for description. In this embodiment of this disclosure, another manner in which the AF network element obtains the transport information for the data stream is not limited. For example, the AF network element may alternatively obtain the transport information for the data stream from another network (for example, another non-TSN network).

In another example, a user may configure, on the AF network element, the information about the ingress port for the data stream and the information about the egress port for the data stream. The configured information about an ingress port for the data stream may include an identifier of a first session. The first session is a session corresponding to the information about the ingress port. Optionally, the information about the ingress port may further include port information of the first session.

The configured information about an egress port for the data stream includes an identifier of a second session. The second session is a session corresponding to the information about the egress port. Optionally, the information about the egress port may further include port information of the second session.

The port information of the first session may be an identifier of a port that is on the side of the UE 1 or the UP 2 and that corresponds to the first session. The port information of the second session may be an identifier of a port that is on the side of the UE 2 or the UP 2 and that corresponds to the second session.

The identifier of the first session may be a MAC address or an IP address of the UE 2 (or the UP 2) corresponding to the first session, or may be an identifier (ID) that has been allocated to the first session. The identifier of the second session may be a MAC address or an IP address of the UE 1 (or the UP 2) corresponding to the second session, or may be an ID that has been allocated to the second session.

Step 605: The AF network element determines, based on the transport information for the data stream, that the data stream is a data stream between UEs, and the AF network element may further determine the identifier of the first session and the identifier of the second session based on the transport information for the data stream.

When the transport information for the data stream includes the identifier of the ingress port of the data stream and the identifier of the second session, the AF network element may determine, based on an association relationship between UE and a session, that the data stream is a data stream between the UEs, and determine that the data stream is from the UE 1 to the UE 2.

For example, the AF network element stores an association relationship between an identifier of a port of UE and a session shown in Table 1, where an identifier of the session is represented by a MAC address that is of the UE (or the UP 2) and that corresponds to the session. If the identifier of the ingress port of the data stream is 1, the identifier of the egress port of the data stream is 2, and in Table 1, a port whose identifier is 1 and a port whose identifier is 2 each are corresponding to an identifier of one session, it indicates that both the egress port and the ingress port are ports on the side of the UE (or the side of the UP 2). Both a receive end and a transmit end of the data stream are UEs. Therefore, the AF network element may determine that the data stream is a data stream between the UEs.

TABLE 1

| Identifier of a port | Session identifier |
| --- | --- |
| 1 | MAC 1 |
| 2 | MAC 2 |
| 3 | |

When the transport information for the data stream includes the identifier of the first session and the identifier of the second session, the AF network element may directly determine, based on the identifier of the first session and the identifier of the first session, that both a receive end and a transmit end of the data stream are UEs and that the data stream is a data stream between the UEs.

Then, the AF network element triggers the PCF network element to configure a PCC rule for the first session and a PCC rule for the second session, and sends first indication information and second indication information to the PCF network element. A sequence in which the AF network element triggers the PCF network element to configure the PCC rule for the first session and the PCC rule for the second session is not limited in this embodiment of this disclosure. In this embodiment of this disclosure, an example in which the AF network element first triggers the PCF network element to configure the PCC rule for the first session, and then triggers the PCF network element to configure the PCC rule for the second session is used for description.

Step 606: The AF network element sends information for configuring the PCC rule for the first session and the first indication information to the PCF network element.

The information for the PCC rule for the first session includes information such as T1 and the stream identifier of the data stream.

Step 607: After the PCF network element receives the information for configuring the PCC rule for the first session, the PCF network element obtains a matched PDB based on T1, determines a 5QI corresponding to the PDB, and uses the 5QI as a 5QI of an uplink stream.

It can be understood that in this embodiment of this disclosure, an example in which the AF network element sends T1 and T2 to the PCF network element is used for description. Actually, the AF network element may alternatively obtain a 5QI through matching based on T1, and send the 5QI to the PCF network element. In a possible implementation, the AF network element has been locally configured with the 5QI of the uplink stream. The AF network element may directly send the 5QI to the PCF network element (in this manner, the AF network element does not need to obtain T1 and T2, in other words, does not need to perform step 601).

Step 608: The PCF network element sends a first forwarding rule creation request to the SMF network element, where the first forwarding rule creation request indicates to create a forwarding rule for the first session, and the first forwarding rule creation request carries the first indication information and information used by the SMF network element for creating the forwarding rule for the first session, for example, the 5QI of the uplink stream and the identifier of the first session (it can be understood that the identifier of the first session may be understood as an identifier of an interface between the PCF network element corresponding to the first session and the SMF network element corresponding to the first session, and the first session is identified by using the interface).

An indication manner of the first indication information is not limited in this embodiment of this disclosure. Refer to the foregoing content. The first indication information may use a direct indication manner. For example, the first indication information is a character indicating that the data stream is a data stream between the terminal devices. Alternatively, an indirect indication manner may be used. The following lists several indirect indication manners.

Manner 1: The first indication information includes the identifier of the ingress port of the data stream and the identifier of the egress port of the data stream.

Manner 2: The first indication information includes the identifier of the egress port of the data stream or the identifier of the second session.

Step 609: After the SMF network element receives the first forwarding rule creation request, the SMF network element determines, based on the first indication information, that the data stream is a data stream between the UEs.

If the first indication information uses the direct indication manner, the SMF network element may directly determine, based on the first indication information, that the data stream is a data stream between the UEs.

If the first indication information uses the manner 1 in the indirect indication manners, a manner in which the SMF network element determines that the data stream is a data stream between the UEs is the same as a manner in which the AF network element determines that the data stream is a data stream between the UEs. Refer to the foregoing description. Details are not described herein again.

If the first indication information uses the manner 2 in the indirect indication manners, when the first indication information is the identifier of the second session, the SMF network element may determine, based on the identifier of the second session, that the receive end of the data stream is the UE 2, to further determine that the data stream is a data stream between the UEs. When the first indication information is the identifier of the egress port of the data stream, the SMF network element may determine, based on the association relationship between the UE and the session and based on the identifier of the egress port of the data stream, that the identifier of the egress port corresponds to the session, to further determine that the data stream is a data stream between the UEs.

Step 610: After determining that the data stream is a data stream between the UEs, the SMF network element may create the forwarding rule for the first session, where the forwarding rule for the first session is configured to local forwarding.

That the forwarding rule for the first session is configured to local forwarding means that when subsequently transmitting the data stream, the UPF network element sends a packet of the data stream to an internal interface (where a specific name of the internal interface is not limited herein), or a forwarding rule of the UPF network element is to send a packet of the data stream by using a session of the UE 2.

Step 611: The SMF network element delivers the forwarding rule created for the first session to the UPF network element, and the UPF network element configures the first session based on the received forwarding rule.

Step 612: The AF network element sends information for configuring the PCC rule for the second session and the second indication information to the PCF network element.

Step 613: After the PCF network element receives the information for configuring the PCC rule for the second session from the AF network element, the PCF obtains a matched PDB based on T2, determines a 5QI corresponding to the PDB, and uses the 5QI as a 5QI of a downlink stream.

It can be understood that in this embodiment of this disclosure, an example in which the AF network element sends T1 and T2 to the PCF network element is used for description. Actually, the AF network element may alternatively obtain a 5QI through matching based on T2, and send the 5QI to the PCF network element. In a possible implementation, the AF network element has been locally configured with the 5QI of the downlink stream. The AF network element may directly send the 5QI to the PCF network element (in this manner, the AF network element does not need to obtain T1 and T2, in other words, does not need to perform step 601).

Step 614: The PCF network element sends a second forwarding rule creation request to the SMF network element, where the second forwarding rule creation request indicates to create a forwarding rule for the second session, and the second forwarding rule creation request carries information used by the SMF network element for creating the forwarding rule for the second session, for example, the 5QI of the downlink stream and the identifier of the second session (for example, an interface that is between the PCF and the SMF and that corresponds to the session). The second forwarding rule creation request further includes the second indication information.

An indication manner of the second indication information is not limited in this embodiment of this disclosure. Refer to the foregoing content. The second indication information may use a direct indication manner. For example, the second indication information is a character indicating that the data stream is a data stream between the terminal devices. Alternatively, an indirect indication manner may be used. The following lists several indirect indication manners.

Manner 1: The second indication information includes the identifier of the ingress port of the data stream and an identifier of the egress port of the second session.

Manner 2: The second indication information includes the identifier of the ingress port of the data stream or the identifier of the first session.

Step 615: After the SMF network element receives the second forwarding rule creation request, the SMF network element determines, based on the second indication information, that the data stream is a data stream between the UEs.

If the second indication information uses the direct indication manner, the SMF network element may directly determine, based on the second indication information, that the data stream is a data stream between the UEs.

If the second indication information uses the manner 1 in the indirect indication manners, a manner in which the SMF network element determines that the data stream is a data stream between the UEs is the same as a manner in which the AF network element determines that the data stream is a data stream between the UEs. Refer to the foregoing description. Details are not described herein again.

If the second indication information uses the manner 2 in the indirect indication manners, when the second indication information is the identifier of the first session, the SMF network element may determine, based on the identifier of the first session, that the transmit end of the data stream is the UE 1, to further determine that the data stream is a data stream between the UEs. When the second indication information is the identifier of the ingress port of the data stream, the SMF network element may determine, based on the association relationship between the UE and the session and based on the identifier of the ingress port of the data stream, that the identifier of the ingress port corresponds to the session, to further determine that the data stream is a data stream between the UEs.

Step 616: After determining that the data stream is a data stream between the UEs, the SMF network element may create the forwarding rule for the second session, where the forwarding rule for the second session is configured to local forwarding.

That the forwarding rule for the second session is configured to local forwarding means that when subsequently transmitting the data stream, the UPF network element matches a packet of the downlink stream from an internal interface (where a specific name of the internal interface is not limited herein).

Step 617: The SMF network element delivers the forwarding rule created for the second session to the UPF network element, and the UPF network element configures the second session based on the received forwarding rule.

Figure 7:
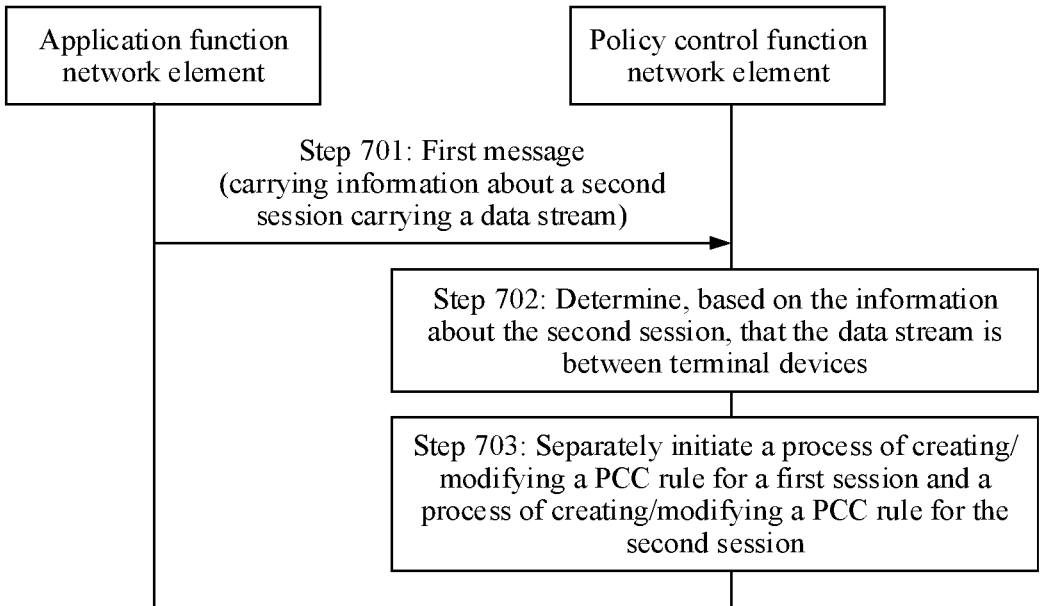

In the embodiments shown in FIG. 5 and FIG. 6A and FIG. 6B, an example in which the AF network element determines that the data stream is a data stream between the terminal devices is used for description. Actually, the PCF network element may alternatively determine that the data stream is a data stream between the terminal devices. The following describes this manner. Refer to FIG. 7. An example in which the application function network element indicates the policy control function network element to configure a PCC rule for a first session is used. The method includes the following steps.

Step 701: The policy control function network element receives a first message of the application function network element, where the first message includes information for configuring a PCC rule for a first session carrying a data stream, and information about a second session carrying the data stream.

The information for configuring the PCC rule for the first session carrying the data stream includes an identifier of the ingress port of the data stream and first delay information, and optionally, may further include an identifier of the first session.

The information about the second session includes a part or all of the following information: an identifier of the second session and an identifier of a port of the second session.

Optionally, the first message may include second delay information or third delay information.

After receiving the first message, the policy control function network element may determine a 5QI of an uplink stream in the data stream based on the first delay information when configuring the PCC rule for the first session.

If the first message further includes second delay information, the policy control function network element may further determine a 5QI of a downlink stream in the data stream based on the second delay information.

If the first message further includes second delay information or third delay information, the policy control function network element may further determine a 5QI of a downlink stream and a 5QI of an uplink stream in the data stream based on the third delay information.

Step 702: The policy control function network element determines, based on the information about the second session, that the data stream is a data stream between terminal devices.

A manner in which the policy control function network element determines that the data stream is a data stream between the terminal devices is the same as the manner in which the session management network element determines that the data stream is a data stream between the terminal devices in the embodiment shown in FIG. 5. For details, refer to the foregoing content. Details are not described herein again.

Step 703: The policy control function network element separately initiates a process of creating/modifying the PCC rule for the first session and a process of creating/modifying a PCC rule for the second session.

A sequence in which the policy control function network element initiates the process of creating/modifying the PCC rule for the first session and the process of creating/modifying the PCC rule for the second session is not limited in this embodiment of this disclosure.

The following uses an example in which the policy control function network element initiates the process of creating/modifying the PCC rule for the second session for description. A process in which the policy control function network element initiates the process of creating/modifying the PCC rule for the first session is similar to a process in which the policy control function network element initiates the process of creating/modifying the PCC rule for the second session. Details are not described herein again.

The policy control function network element sends a second forwarding rule creation request to the session management network element, where the second forwarding rule creation request indicates to create a forwarding rule for the second session, and the second forwarding rule creation request includes information (information such as the 5QI of the downlink stream) for creating the forwarding rule for the second session. After receiving the second forwarding rule creation request, the session management network element configures the forwarding rule for the second session to local forwarding. For details, refer to related descriptions of step 506*b*. Details are not described herein again.

In the embodiment shown in FIG. 7, an example in which the policy control function network element receives the information for configuring the PCC rule for the first session carrying the data stream and the information about the second session carrying the data stream, where the first session carries an uplink stream, and the second session carries a downlink stream is used for description. If the first session carries a downlink stream, the second session carries an uplink stream, the embodiment shown in FIG. 7 is also applicable. Details are not described herein again.

Figure 8:
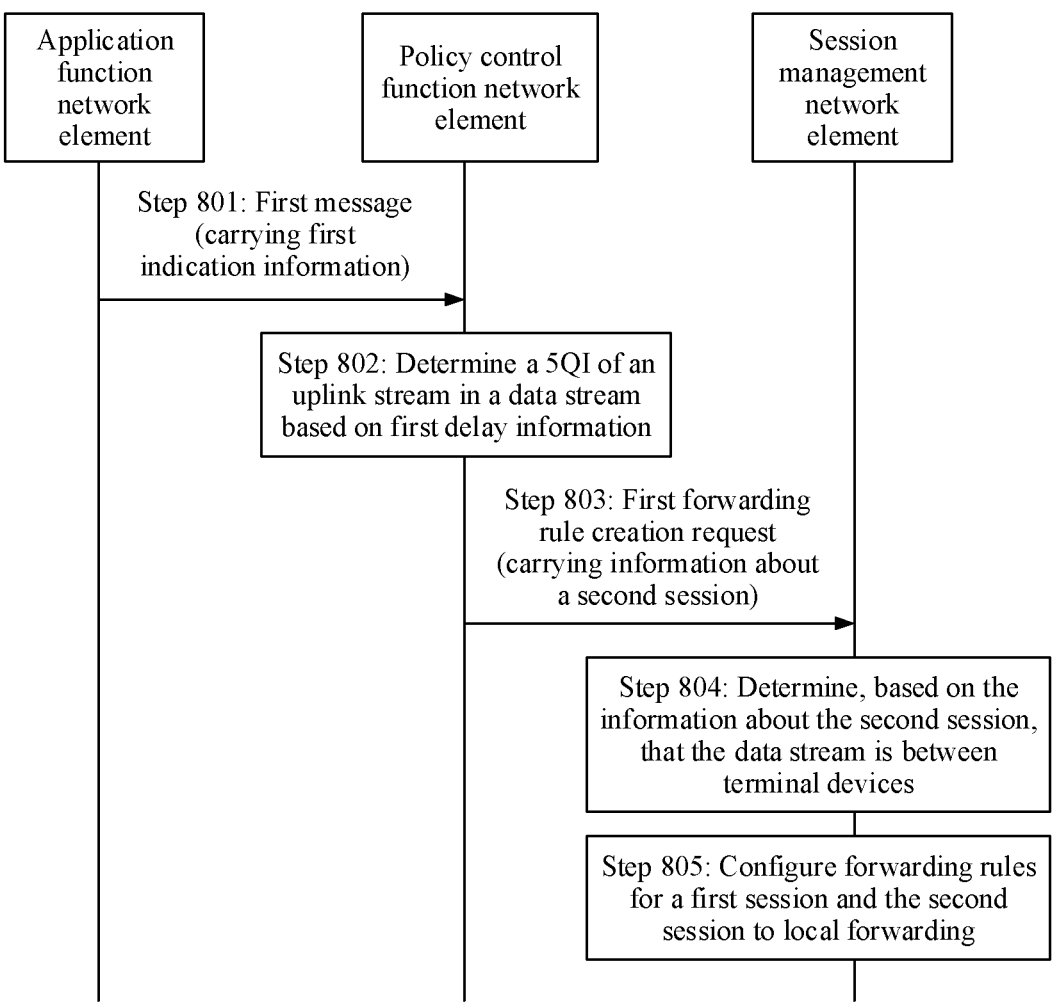

Actually, the SMF network element may alternatively determine that the data stream is a data stream between the terminal devices. The following describes this manner. Refer to FIG. 8. An example in which the application function network element indicates the policy control function network element to configure a PCC rule for a first session is used. The method includes the following steps.

Step 801: The policy control function network element receives a first message of the application function network element, where the first message includes information for configuring a PCC rule for a first session carrying a data stream, and information about a second session carrying the data stream.

The information for configuring the PCC rule for the first session carrying the data stream includes an identifier of the ingress port of the data stream and first delay information, and optionally, may further include an identifier of the first session.

The information about the second session includes a part or all of the following information: an identifier of the second session and an identifier of a port of the second session.

Step 802: The policy control function network element configures the PCC rule for the first session, and determines a 5QI of an uplink stream in the data stream based on the first delay information.

Step 803: The policy control function network element sends a first forwarding rule creation request to the session management network element, where the second forwarding rule creation request indicates to create a forwarding rule for the first session, and the first forwarding rule creation request includes the information about the second session and information (information such as the 5QI of the uplink stream) for creating the forwarding rule for the first session.

Step 804: The session management network element determines, based on the information about the second session, that the data stream is a data stream between the terminal devices. For details, refer to related descriptions in which the session management network element determines that the data stream is a data stream between the terminal devices when the second indication information uses the indirect indication manner in step 505*b*. Details are not described herein again.

Step 805: The session management network element configures the forwarding rule for the first session and a forwarding rule for the second session to local forwarding. For details, refer to related descriptions of steps 506*b* and 506*a*. Details are not described herein again.

The information about the second session includes an identifier of a port of the second session. The session management network element may determine the second session based on a stored association relationship between port information and a session and based on the identifier of the port of the second session. The information about the second session includes the identifier of the second session. The session management network element may directly determine the second session based on the identifier of the first session.

Figure 9A:
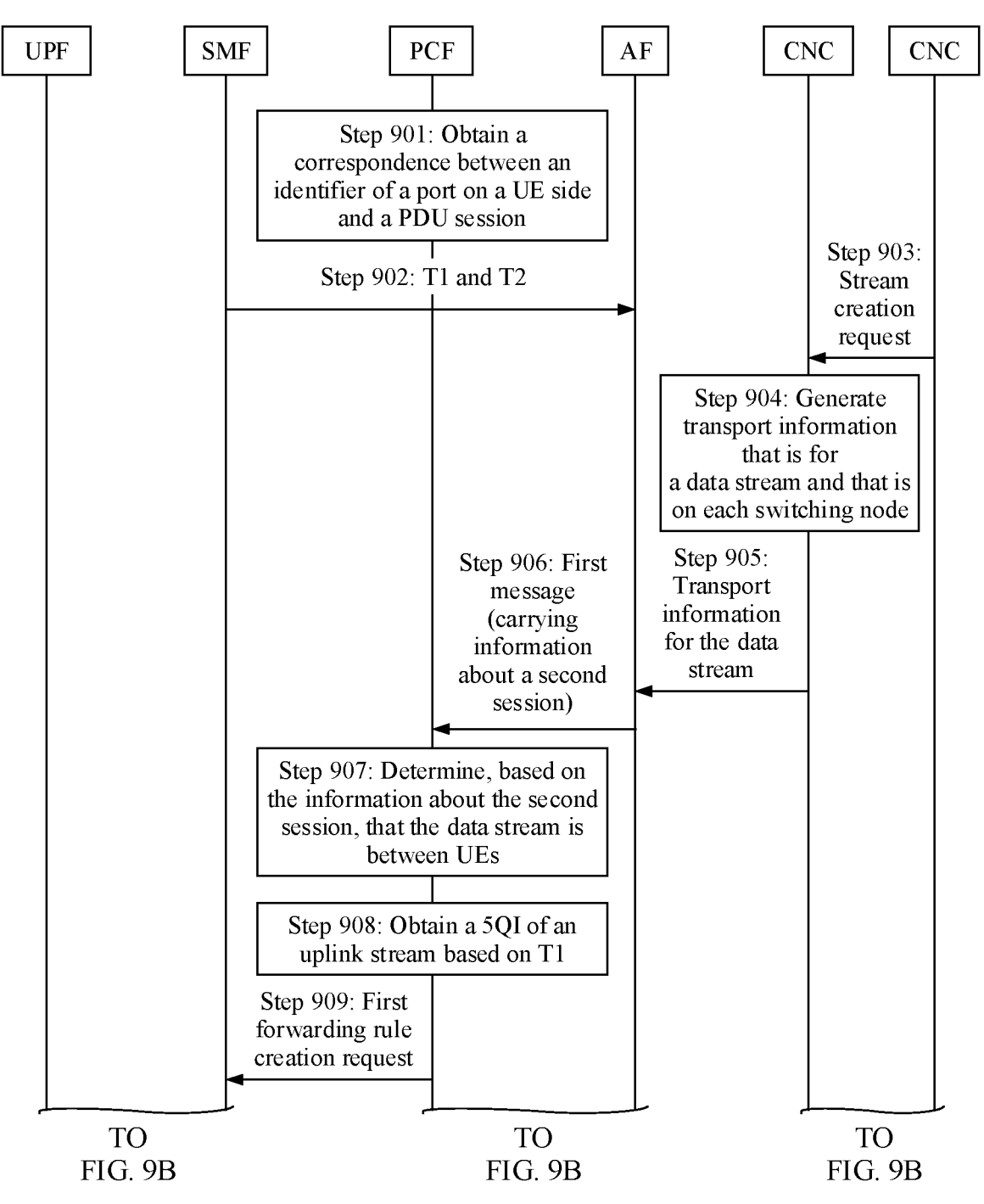
Figure 9B:
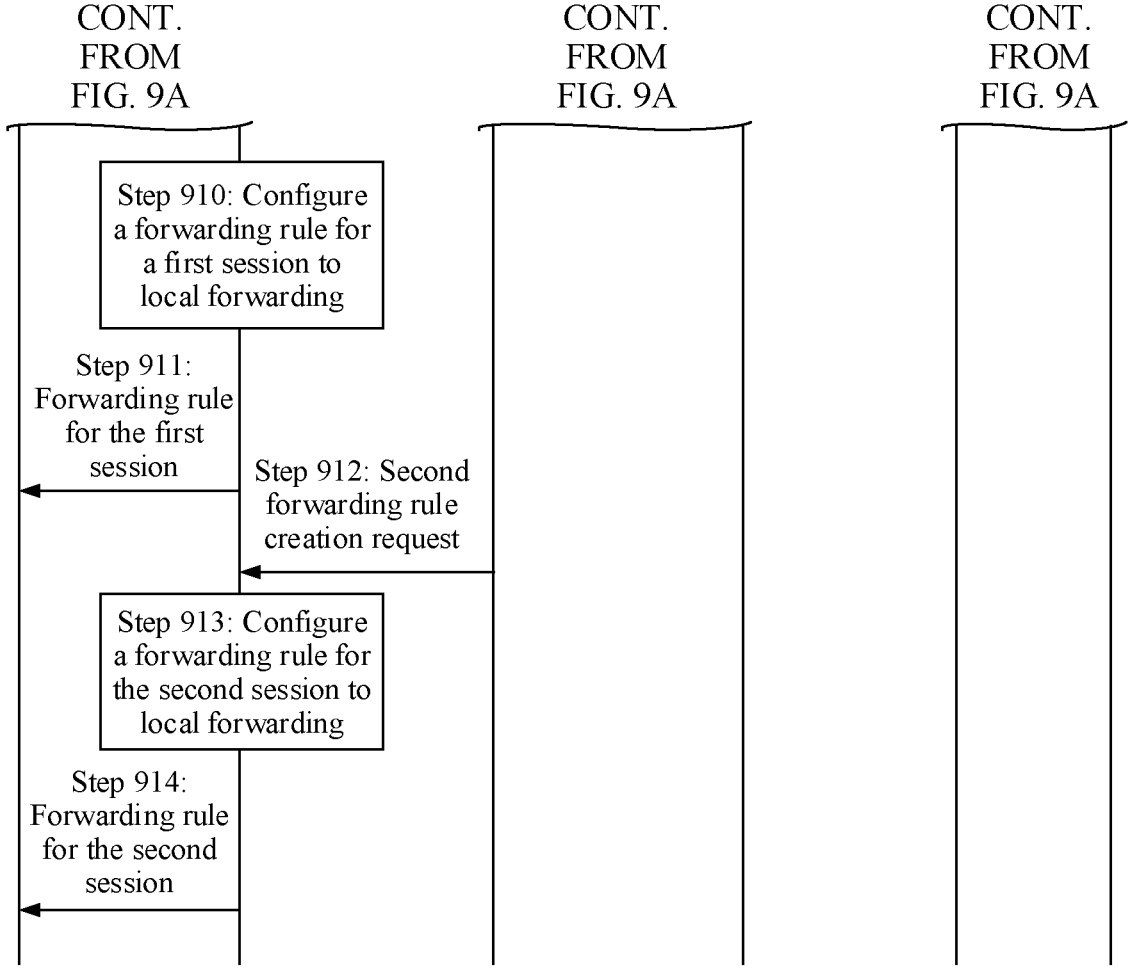

Based on the network architecture shown in FIG. 4B, the embodiment shown in FIG. 7 is further described by using an example in which the application function network element is an AF network element, the session management network element is an SMF network element, the policy control function network element is a PCF network element, and the centralized network configuration network element is a CNC network element. As shown in FIG. 9A and FIG. 9B, the method includes the following steps.

Step 901: The PCF network element obtains an association relationship between an identifier of a port on a UE side and a PDU session, and stores the association relationship between the identifier of the port on the UE side and the PDU session.

The association relationship between the identifier of the port on the UE side and the PDU session may be sent by the SMF network element to the PCF network element.

Step 902: This step is the same as step 601. For details, refer to related descriptions of step 601. Details are not described herein again.

Step 903: This step is the same as step 602. For details, refer to related descriptions of step 602. Details are not described herein again.

Step 904: This step is the same as step 603. For details, refer to related descriptions of step 603. Details are not described herein again.

Step 905: This step is the same as step 604. For details, refer to related descriptions of step 604. Details are not described herein again.

Step 906: The AF network element sends a first message to the PCF network element, where the first message includes information for configuring a PCC rule for a first session and information about a second session.

The information for configuring the PCC rule for the first session includes an identifier of the ingress port of a data stream and delay information T1 between UE 1 and a UPF network element, and optionally, may further include an identifier of the first session (namely, an identifier of a session of the UE 1).

Optionally, the first message may further include delay information T2 between UE 2 and the UPF network element or delay information T3 between the UE 1 and the UE 2.

Step 907: The PCF network element determines, based on the information about the second session, that the data stream is a data stream between UEs. A manner in which the PCF network element determines that the data stream is a data stream between the UEs is the same as the manner in which the SMF network element determines that the data stream is a data stream between the UEs when the first indication information uses the indirect indication manner in step 609. For details, refer to the foregoing descriptions. Details are not described herein again.

Step 908: This step is the same as step 607. For details, refer to related descriptions of step 607. Details are not described herein again.

Optionally, if the first message further includes T2, a matched PDB is obtained based on T2, a 5QI corresponding to the PDB is determined, and the 5QI is used as a 5QI of a downlink stream.

If the first message further includes T2 or T3, two matched PDBs are obtained based on T3 (T3 may be determined based on a sum value of T1 and T2), two 5QIs corresponding to the two PDBs are determined, one of the two 5QIs is used as a 5QI of a downlink stream, and the other 5QI is used as a 5QI of an uplink stream.

Optionally, the PCF network element may alternatively use a 5QI of an uplink stream as a 5QI of a downlink stream directly.

Step 909: The PCF network element sends a first forwarding rule creation request to the SMF network element, where the first forwarding rule creation request indicates to create a forwarding rule for the first session, and the first forwarding rule creation request carries information used by the SMF network element for creating the forwarding rule for the first session.

Steps 910 and 911: These steps are the same as steps 610 and 611. For details, refer to related descriptions of steps 610 and 611. Details are not described herein again.

Step 912: The PCF network element sends a second forwarding rule creation request to the SMF network element, where the second forwarding rule creation request indicates to create a forwarding rule for the second session, and the second forwarding rule creation request carries information used by the SMF network element for creating the forwarding rule for the second session.

Steps 913 and 914: These steps are the same as steps 616 and 617. For details, refer to related descriptions of steps 616 and 617. Details are not described herein again.

In the embodiment shown in FIG. 9A and FIG. 9B, an example in which the AF network element triggers the PCF network element to configure the PCC rule for the first session is used for description. Actually, the AF network element may alternatively trigger the PCF network element to configure a PCC rule for the second session. When the AF network element triggers the PCF network element to configure the PCC rule for the second session, the PCF network element determines that the data stream is a data stream between the UEs. A manner and an embodiment in which the SMF network element creates the second session and the forwarding rule for the second session under an indication of the PCF network element are similar to the manner and embodiment of creating the forwarding rule for the first session in the embodiment shown in FIG. 9A and FIG. 9B. Details are not described herein again.

Figure 10A:
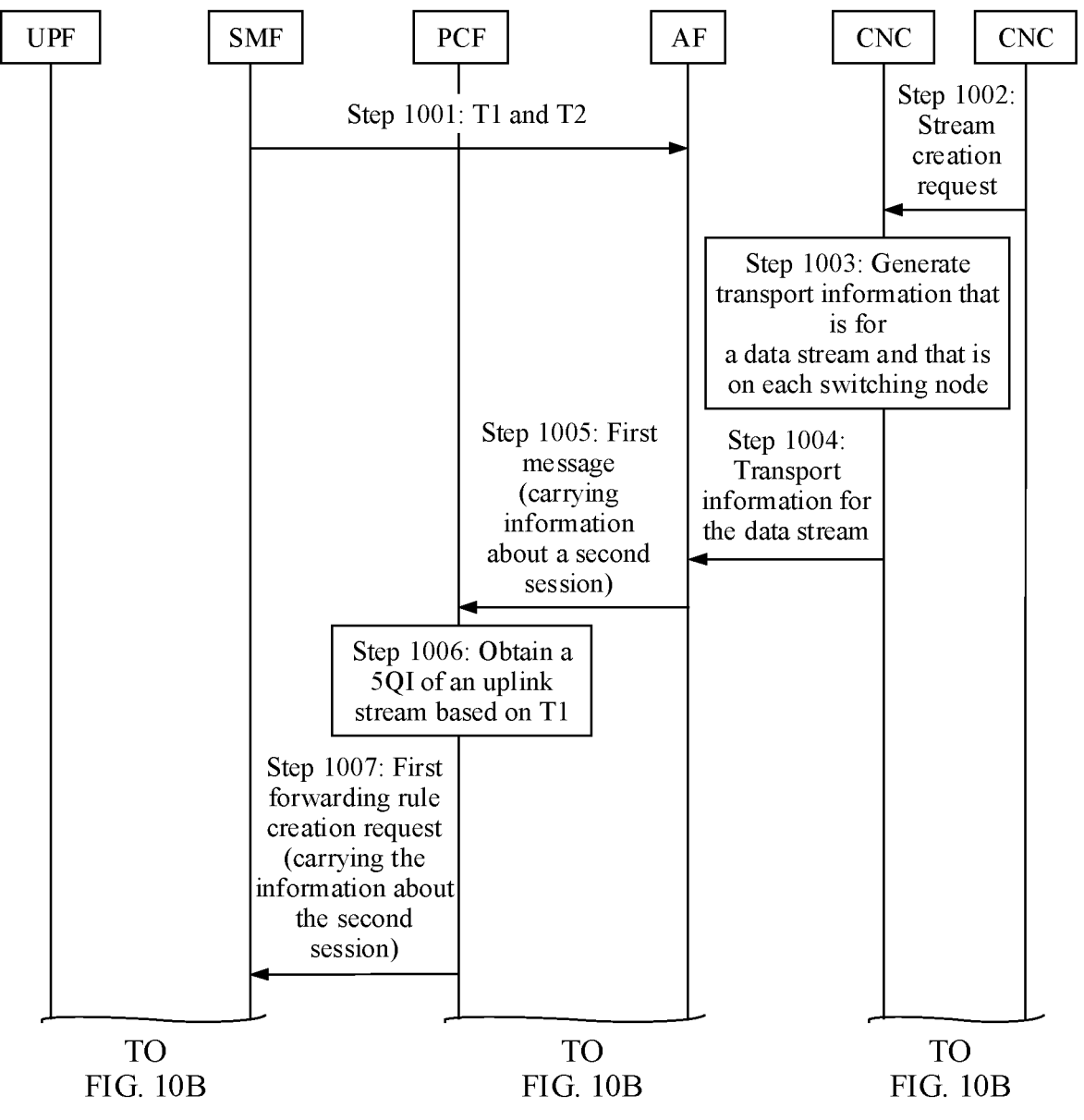
Figure 10B:
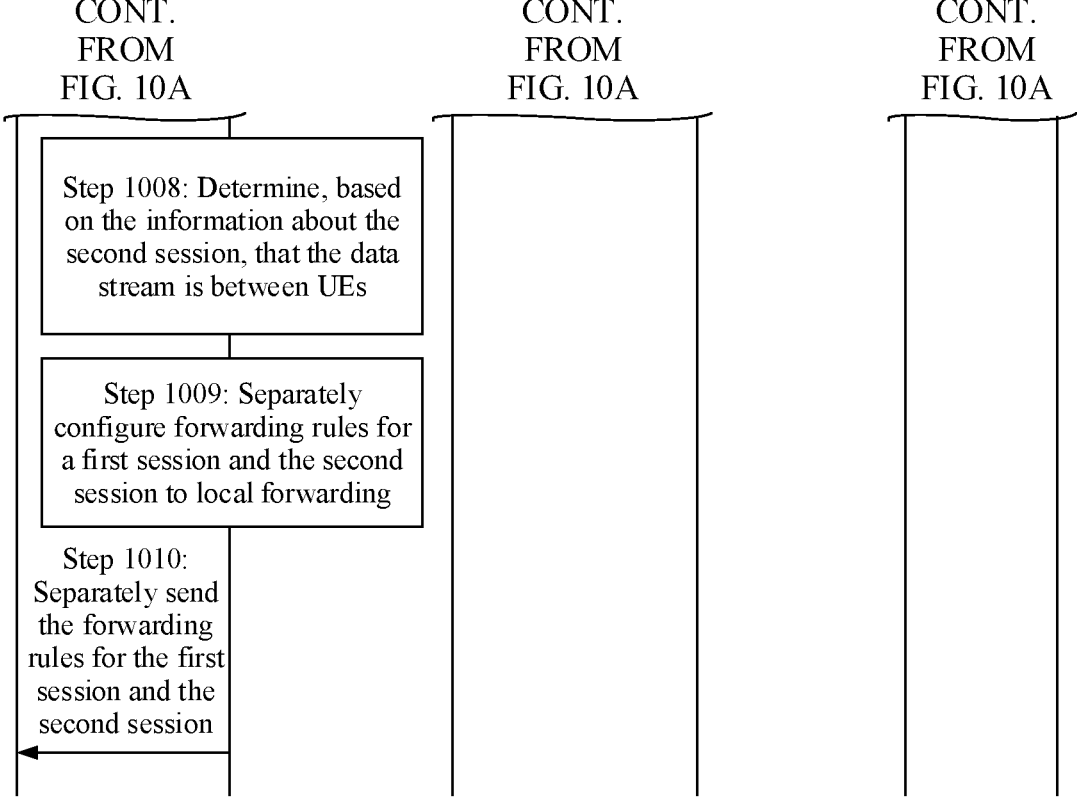

Based on the network architecture shown in FIG. 4B, the embodiment shown in FIG. 8 is further described by using an example in which the application function network element is an AF network element, the session management network element is an SMF network element, the policy control function network element is a PCF network element, and the centralized network configuration network element is a CNC network element. As shown in FIG. 10A and FIG. 10B, the method includes the following steps.

Step 1001: This step is the same as step 601. For details, refer to related descriptions of step 601. Details are not described herein again.

Step 1002: This step is the same as step 602. For details, refer to related descriptions of step 602. Details are not described herein again.

Step 1003: This step is the same as step 603. For details, refer to related descriptions of step 603. Details are not described herein again.

Step 1004: This step is the same as step 604. For details, refer to related descriptions of step 604. Details are not described herein again.

Step 1005: The AF network element sends a first message to the PCF network element, where the first message includes information for configuring a PCC rule for a first session and information about a second session.

The information for configuring the PCC rule for the first session includes an identifier of the ingress port of a data stream and delay information T1 between UE 1 and a UPF network element, and optionally, may further include an identifier of the first session (namely, an identifier of a session of the UE 1).

Step 1006: This step is the same as step 607. For details, refer to related descriptions of step 607. Details are not described herein again.

Step 1007: The PCF network element sends a first forwarding rule creation request to the SMF network element, to request to create a forwarding rule for the first session, where the first forwarding rule creation request carries information used by the SMF network element for creating the forwarding rule for the first session and the information about the second session, and the information used by the SMF network element for creating the forwarding rule for the first session includes but is not limited to: a 5QI of an uplink stream or the identifier of the first session (for example, an identifier of an interface between the PCF network element corresponding to the session and the SMF network element corresponding to the session).

Step 1008: The SMF network element determines, based on the information about the second session, that the data stream is a data stream between UEs. A manner in step 1007 is the same as the manner in which the SMF network element determines that the data stream is a data stream between the UEs when the first indication information uses the indirect indication manner in step 609. For details, refer to the foregoing descriptions. Details are not described herein again.

Step 1009: The SMF network element separately creates the forwarding rule for the first session and the forwarding rule for the second session, configures the forwarding rule for the first session to local forwarding, and configures the forwarding rule for the second session to local forwarding.

Step 1010: The SMF network element delivers the forwarding rule created for the first session and the forwarding rule created for the second session to a UPF network element, and the UPF network element configures the first session and the second session based on received forwarding rules.

In the embodiment shown in FIG. 10A and FIG. 10B, an example in which the AF network element triggers the PCF network element to configure the PCC rule for the first session is used for description. Actually, the AF network element may alternatively trigger the PCF network element to configure a PCC rule for the second session. When the AF network element triggers the PCF network element to configure the PCC rule for the second session, the SMF network element determines that the data stream is a data stream between the UEs. A manner and an embodiment in which the SMF network element establishes the second session and the forwarding rule for the second session are similar to the embodiment shown in FIG. 10A and FIG. 10B. Details are not described herein again.

Figure 11A:
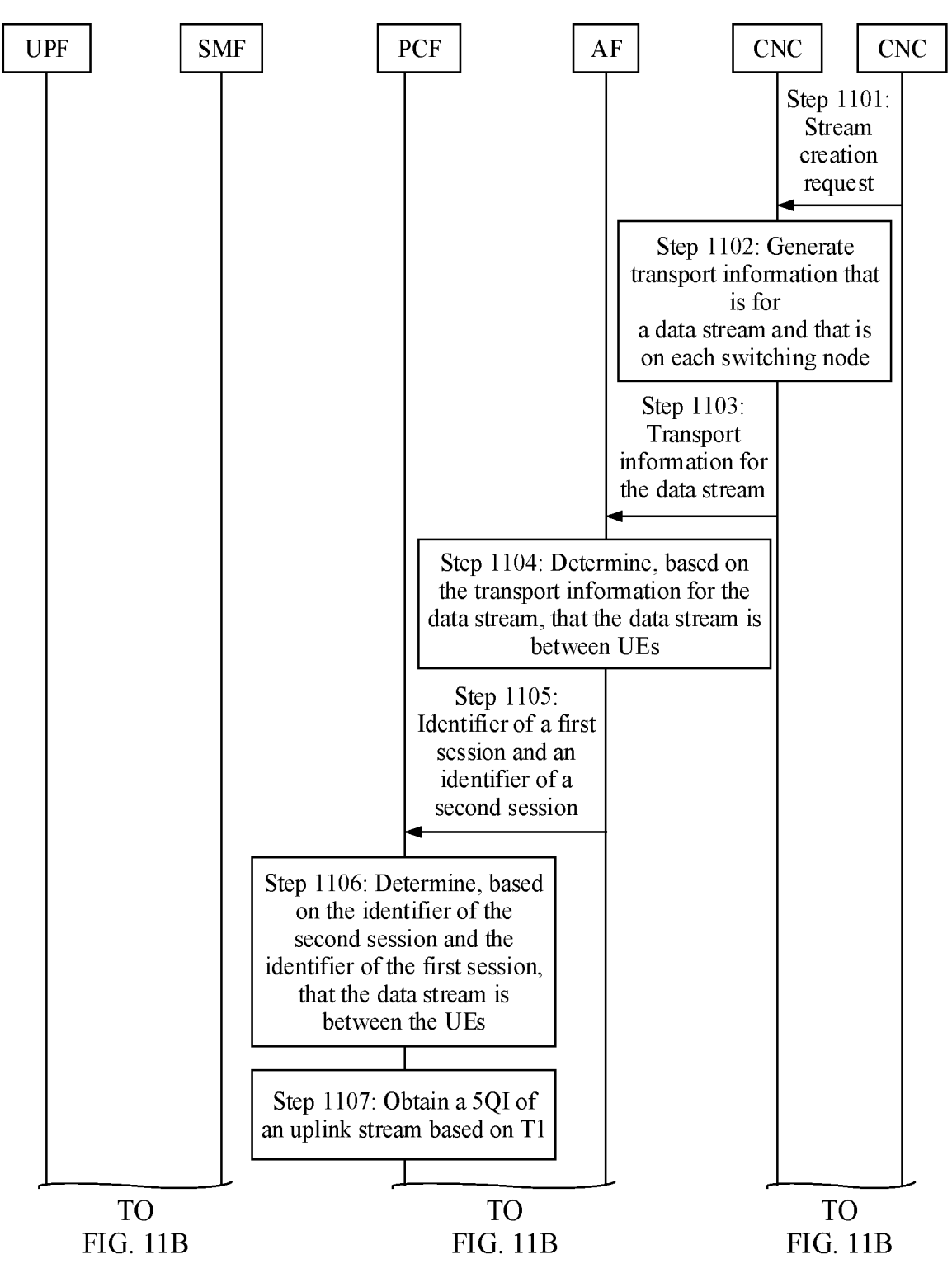
Figure 11B:
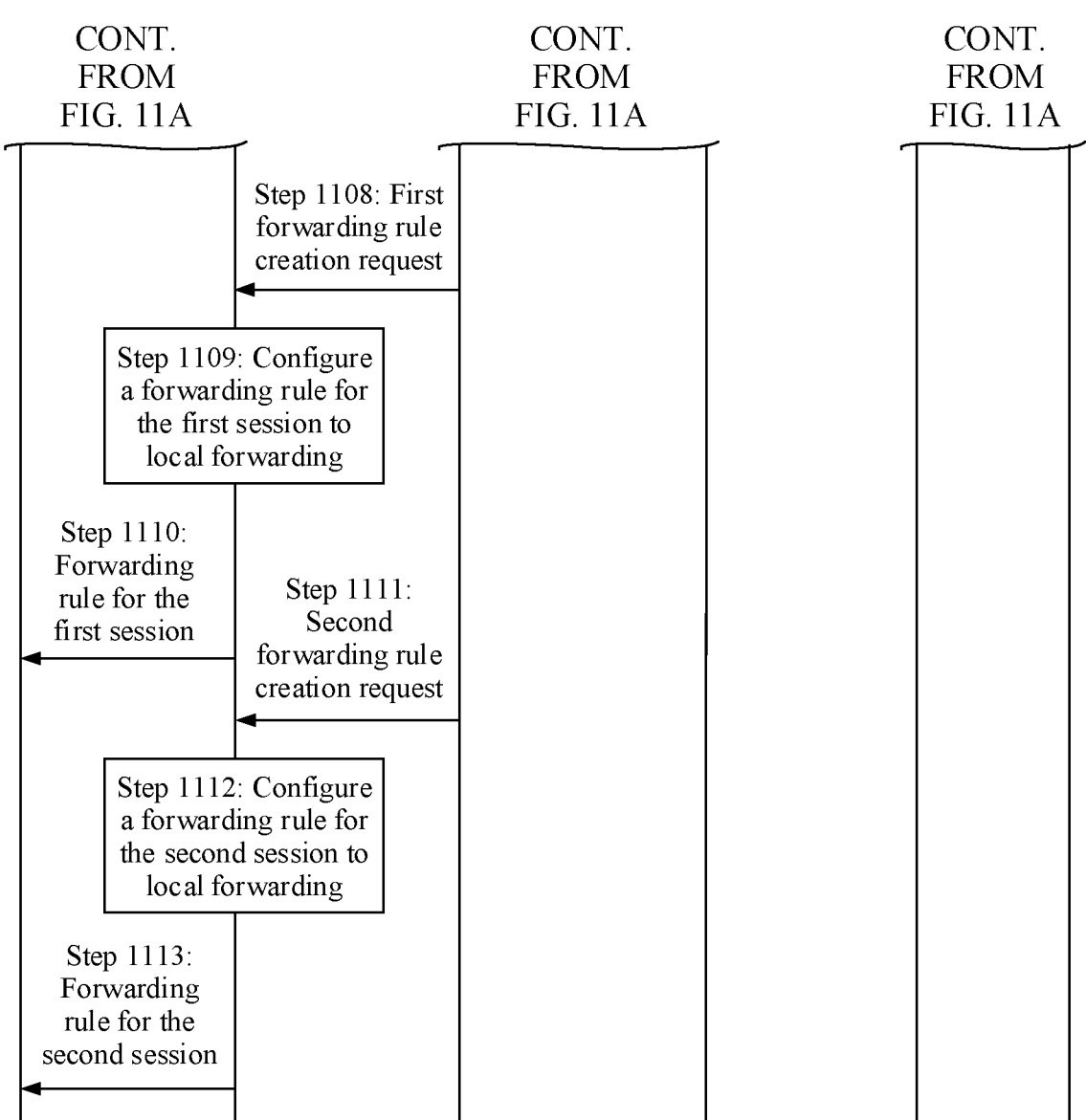

With reference to FIG. 6A and FIG. 6B and FIG. 9A and FIG. 9B, an embodiment of this disclosure further provides a communication method. As shown in FIG. 11A and FIG. 11B, the method includes the following steps.

Step 1101: This step is the same as step 602. For details, refer to related descriptions of step 602. Details are not described herein again.

Step 1102: This step is the same as step 603. For details, refer to related descriptions of step 603. Details are not described herein again.

Step 1103: This step is the same as step 604. For details, refer to related descriptions of step 604. Details are not described herein again.

Step 1104: This step is the same as step 605. For details, refer to related descriptions of step 605. Details are not described herein again.

Step 1105: The AF network element separately triggers the PCF network element to configure a PCC rule for a first session and a PCC rule for a second session, and sends an identifier of the first session and an identifier of the second session to the PCF network element.

That the AF network element separately triggers the PCF network element to configure a PCC rule for a first session and a PCC rule for a second session means that the AF network element separately sends, to the PCF network element, information for configuring the PCC rule for the first session and information for configuring the PCC rule for the second session. The AF network element may send the identifier of the first session and the identifier of the second session when sending the information for configuring the PCC rule for the first session to the PCF network element, or may send the identifier of the first session and the identifier of the second session when sending the information for configuring the PCC rule for the second session to the PCF network element. This is not limited in this embodiment of this disclosure.

Step 1106: The PCF network element determines, based on the identifier of the first session and the identifier of the second session, that the data stream is a data stream between the UEs. A quantity of identifiers of the second session is not limited in this embodiment of this disclosure, and there may be one or more identifiers of the second session.

Steps 1107 to 1113: These steps are the same as steps 908 to 914. For details, refer to related descriptions of steps 908 to 914. Details are not described herein again.

Figures 12, 13, 14, 15, 16:
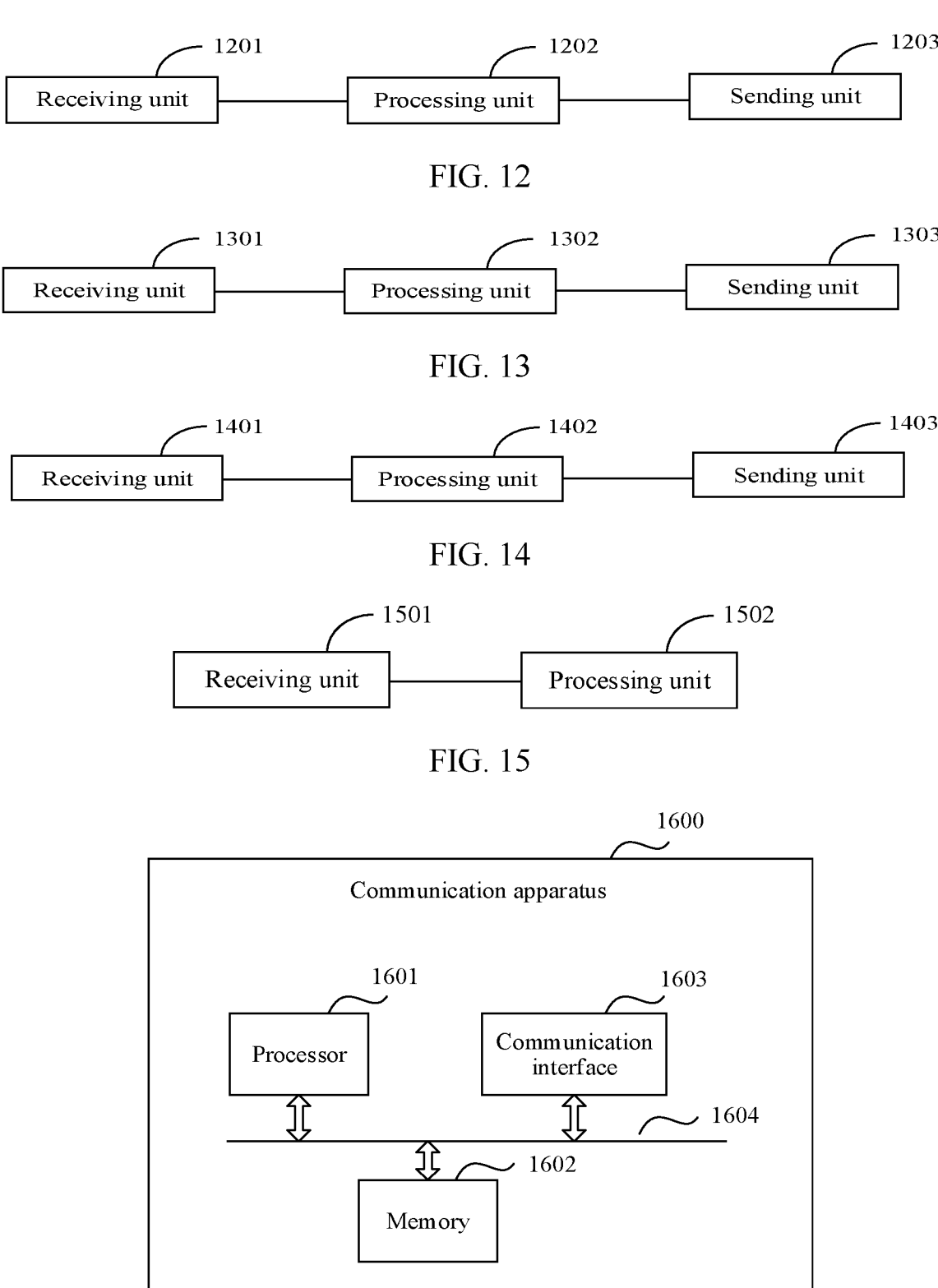
FIG. 12 to FIG. 16 each are a schematic diagram of a structure of a communication apparatus according to an embodiment of this disclosure.

Based on a same concept as that of the method embodiments, an embodiment of this disclosure further provides a communication apparatus, configured to perform the method performed by the AF network element in the method embodiments shown in FIG. 5 and FIG. 6A and FIG. 6B. For related features, refer to the foregoing method embodiments. Details are not described herein again. As shown in FIG. 12, the apparatus includes a receiving unit 1201 and a processing unit 1202.

The receiving unit 1201 is configured to obtain transport information for a data stream. The transport information for the data stream includes information about an ingress port for the data stream and information about an egress port for the data stream.

The processing unit 1202 is configured to determine, based on the transport information for the data stream, that the data stream is a data stream between terminal devices; and trigger a core network device to configure a PCC rule for a first session corresponding to the information about the ingress port and a PCC rule for a second session corresponding to the information about the egress port.

In a possible implementation, the information about the ingress port includes an identifier of the ingress port of the data stream, and the information about the egress port includes an identifier of the egress port of the data stream. When determining, based on the transport information for the data stream, that the data stream is a data stream between the terminal devices, the processing unit 1202 may determine, based on the identifier of the egress port and the identifier of the ingress port, that the data stream is a data stream between a first terminal device and a second terminal device. The identifier of the egress port is an identifier of a port on a side of a second terminal device, and the identifier of the ingress port is an identifier of a port on a side of a first terminal device.

In a possible implementation, when determining, based on the identifier of the egress port and the identifier of the ingress port, that the data stream is a data stream between the terminal devices, the processing unit 1202 may determine, based on an association between the identifier of the egress port and the first session and an association between the identifier of the ingress port and the second session, that the data stream is a data stream between the terminal devices.

In a possible implementation, the data stream is a data stream from the first terminal device to the second terminal device, the first session is a session established by the first terminal device, and the second session is a session established by the second terminal device.

In a possible implementation, the apparatus further includes a sending unit 1203. Before the receiving unit 1201 obtains the transport information for the data stream, the processing unit 1202 may further determine that the first terminal device and the second terminal device can communicate with each other.

The sending unit 1203 may report, based on obtained delay information of the first terminal device and delay information of the second terminal device, a transmission delay between a port on the side of the first terminal device and a port on the side of the second terminal device to a device in time sensitive networking. The delay information of the second terminal device indicates a transmission delay between the port on the side of the second terminal device and a data network. The delay information of the first terminal device indicates a transmission delay between the port on the side of the first terminal device and the data network.

In a possible implementation, before the receiving unit 1201 obtains the transport information for the data stream, the receiving unit 1201 may receive the delay information of the first terminal device when the first terminal device establishes the first session, and receive the delay information of the second terminal device and third indication information when the second terminal device establishes the second session. The third indication information indicates that the port on the side of the first terminal device and the port on the side of the second terminal device are a port pair.

The processing unit 1202 may determine, based on the third indication information, that the first terminal device and the second terminal device can communicate with each other.

In a possible implementation, before the receiving unit 1201 obtains the transport information for the data stream, the receiving unit 1201 may receive the delay information of the second terminal device when the second terminal device establishes the second session; and receive the delay information of the first terminal device and fourth indication information when the first terminal device establishes the first session. The fourth indication information indicates that the port on the side of the first terminal device and the port on the side of the second terminal device are a port pair.

The processing unit 1202 may determine, based on the fourth indication information, that the first terminal device and the second terminal device can communicate with each other.

In a possible implementation, before the receiving unit 1201 obtains the transport information for the data stream, the receiving unit 1201 may receive the delay information of the first terminal device when the first terminal device establishes the first session, and receive the delay information of the second terminal device when the second terminal device establishes the second session.

When determining that the first terminal device and the second terminal device can communicate with each other, the processing unit 1202 may determine, based on group information, that the first terminal device and the second terminal device can communicate with each other.

In a possible implementation, the sending unit 1203 may send first indication information to the core network device. The first indication information indicates that the data stream is a data stream between the terminal devices.

In a possible implementation, there are many manners in which the first indication information indicates that the data stream is a data stream between the terminal devices, and a direct indication manner may be used. For example, the first indication information is a character indicating that the data stream is a data stream between the terminal devices. Alternatively, an indirect indication manner may be used. The following lists several indirect indication manners.

Manner 1: The first indication information includes the identifier of the ingress port of the data stream and the identifier of the egress port of the data stream.

Manner 2: The first indication information includes an identifier of the first session and an identifier of the second session.

Manner 3: The first indication information includes the identifier of the egress port or an identifier of the second session.

In a possible implementation, the sending unit 1203 may further send second indication information to the core network device. The second indication information indicates that the data stream is a data stream between the terminal devices.

In a possible implementation, there are many manners in which the second indication information indicates that the data stream is a data stream between the terminal devices, and a direct indication manner may be used. For example, a character indicating that the data stream is a data stream between the terminal devices is sent. Alternatively, an indirect indication manner may be used. The following lists several indirect indication manners.

Manner 1: The second indication information includes the identifier of the ingress port of the data stream and the identifier of the egress port of the data stream.

Manner 2: The second indication information includes an identifier of the first session and an identifier of the second session.

Manner 3: The second indication information includes the identifier of the ingress port or an identifier of the first session.

In a possible implementation, the information about the ingress port includes an identifier of the first session, and the information about the egress port includes an identifier of the second session. When determining, based on the transport information for the data stream, that the data stream is a data stream between the terminal devices, the processing unit 1202 may determine, on the basis that the information about the ingress port includes the identifier of the first session and the information about the egress port includes the identifier of the second session, that the data stream is a data stream between the terminal devices.

Based on a same concept as that of the method embodiments, an embodiment of this disclosure further provides a communication apparatus, configured to perform the method performed by the SMF in the method embodiments shown in FIG. 5 and FIG. 6A and FIG. 6B. For related features, refer to the foregoing method embodiments. Details are not described herein again. As shown in FIG. 13, the apparatus includes a receiving unit 1301 and a processing unit 1302.

The receiving unit 1301 is configured to receive a first forwarding rule creation request from a policy control function network element. The first forwarding rule creation request indicates to create a forwarding rule for a first session carrying a data stream, and the first forwarding rule creation request includes first indication information.

The processing unit 1302 is configured to determine, based on the first indication information, that the data stream is a data stream between terminal devices; and configure the forwarding rule for the first session to local forwarding based on the first forwarding rule creation request.

In a possible implementation, the first indication information has a plurality of indication manners. For example, a direct indication manner may be used. For example, the first indication information is a character indicating that the data stream is a data stream between the terminal devices. In this way, the processing unit 1302 can directly determine, based on the first indication information, that the data stream is a data stream between the terminal devices. In another example, the first indication information may also use an indirect indication manner. The following lists several indirect indication manners in which the processing unit 1302 may directly determine, based on the first indication information, that the data stream is a data stream between the terminal devices.

Manner 1: The first indication information includes the identifier of the ingress port of the data stream and the identifier of the egress port of the data stream.

The processing unit 1302 may determine, based on an association relationship between an identifier of a port on a terminal device side and a session and based on an association between a session and each of the identifier of the ingress port and the identifier of the egress port, that the data stream is a data stream between the terminal devices. For example, the egress port is associated with the first session, and the ingress port is associated with a second session.

Manner 2: The first indication information includes an identifier of the first session and an identifier of a second session.

The processing unit 1302 may directly determine, on the basis that the first indication information includes the identifier of the first session and the identifier of the second session, that the data stream is carried in the two sessions, to further determine that the data stream is a data stream between the terminal devices.

Manner 3: The first indication information includes the identifier of the egress port or an identifier of a second session carrying the data stream.

The processing unit 1302 may determine, based on an association relationship between an identifier of a port on a terminal device side and a session and based on the identifier of the egress port, that the data stream is a data stream between the terminal devices, where the identifier of the egress port is an identifier of a port on a side of a second terminal device; or determine, based on the identifier of the second session carrying the data stream, that the data stream is a data stream between the terminal devices.

In a possible implementation, the receiving unit 1301 may further receive a second forwarding rule creation request from the policy control function network element. The second forwarding rule creation request indicates to create a forwarding rule for a second session carrying the data stream, and the second forwarding rule creation request includes second indication information.

The processing unit 1302 may determine, based on the second indication information, that the data stream is a data stream between the terminal devices; and configure the forwarding rule for the second session to local forwarding based on the second forwarding rule creation request.

In a possible implementation, the second indication information has a plurality of indication manners. For example, a direct indication manner may be used. For example, the second indication information is a character indicating that the data stream is a data stream between the terminal devices. In this way, the processing unit 1302 can directly determine, based on the second indication information, that the data stream is a data stream between the terminal devices. In another example, the second indication information may also use an indirect indication manner. The following lists several indirect indication manners in which the processing unit 1302 may directly determine, based on the second indication information, that the data stream is a data stream between the terminal devices.

Manner 1: The second indication information includes the identifier of the ingress port of the data stream and the identifier of the egress port of the data stream.

The processing unit 1302 may determine, based on an association relationship between an identifier of a port on a terminal device side and a session and based on an association between a session and each of the identifier of the ingress port and the identifier of the egress port, that the data stream is a data stream between the terminal devices. For example, the egress port is associated with the first session, and the ingress port is associated with a second session.

Manner 2: The second indication information includes an identifier of the first session and an identifier of a second session.

The processing unit 1302 may directly determine, on the basis that the second indication information includes the identifier of the first session and the identifier of the second session, that the data stream is carried in the two sessions, to further determine that the data stream is a data stream between the terminal devices.

Manner 3: The second indication information includes the identifier of the ingress port or an identifier of the first session carrying the data stream.

The processing unit 1302 may determine, based on an association relationship between an identifier of a port on a terminal device side and a session and based on the identifier of the ingress port, that the data stream is a data stream between terminal devices, where the identifier of the ingress port is an identifier of a port on a side of a first terminal device; or determine, based on the identifier of the first session carrying the data stream, that the data stream is a data stream between terminal devices.

In a possible implementation, the data stream is from the first terminal device to the second terminal device, the identifier of the ingress port is an identifier of a port on the side of the first terminal device, the identifier of the egress port is the identifier of the port on the side of the second terminal device. The apparatus further includes a sending unit 1303. The receiving unit 1301 may obtain delay information of the second terminal device. The processing unit 1302 may determine that the second terminal device and the first terminal device can communicate with each other. Then, the sending unit 1303 sends the delay information of the second terminal device and third indication information to an application function network element. The third indication information indicates that a port on the side of the first terminal device and a port on the side of the second terminal device are a port pair.

In a possible implementation, the data stream is from the first terminal device to the second terminal device, the identifier of the ingress port is an identifier of a port on the side of the first terminal device, the identifier of the egress port is the identifier of the port on the side of the second terminal device. The receiving unit 1301 may obtain delay information of the first terminal device. The processing unit 1302 may determine that the second terminal device and the first terminal device can communicate with each other. Then, the sending unit 1303 sends the delay information of the first terminal device and fourth indication information to the application function network element. The fourth indication information indicates that a port on the side of the first terminal device and a port on the side of the second terminal device are a port pair.

Based on a same concept as that of the method embodiments, an embodiment of this disclosure further provides a communication apparatus, configured to perform the method performed by the PCF network element in the method embodiments shown in FIG. 7, FIG. 9A and FIG. 9B, and FIG. 11A and FIG. 11B. For related features, refer to the foregoing method embodiments. Details are not described herein again. As shown in FIG. 14, the apparatus includes a receiving unit 1401 and a processing unit 1402.

The receiving unit 1401 is configured to receive a first message of an application function network element. The first message includes information for configuring a PCC rule for a first session carrying a data stream, and information about a second session carrying the data stream.

The processing unit 1402 is configured to determine, based on the information about the second session, that the data stream is a data stream between terminal devices; and separately initiate a process of creating/modifying the PCC rule for the first session and a process of creating/modifying a PCC rule for the second session.

In a possible implementation, the information about the second session includes an identifier of a port of the second session. When determining, based on the information about the second session, that the data stream is a data stream between the terminal devices, the processing unit 1402 may determine, based on a correspondence between an identifier of a port on a terminal device side and a session and based on the identifier of the port of the second session, that the data stream is a data stream between the terminal devices.

In a possible implementation, the data stream is from a first terminal device to a second terminal device, and the first message further includes a part or all of the following information: delay information of the first session, delay information of the second session, and third delay information.

The delay information of the first session indicates a transmission delay between a port on a side of the first terminal device and a data network. The delay information of the second session indicates a transmission delay between a port on a side of the second terminal device and the data network, and the third delay information. The third delay information indicates a transmission delay between the port on the side of the first terminal device and the port on the side of the second terminal device.

In a possible implementation, the apparatus further includes a sending unit 1403. When separately initiating the process of creating/modifying the PCC rule for the first session and the process of creating/modifying the PCC rule for the second session, the processing unit 1402 may determine 5QIs of the first session and the second session based on the first message.

The sending unit 1403 sends the 5QIs of the first session and the second session to the session management network element.

Based on a same concept as that of the method embodiments, an embodiment of this disclosure further provides a communication apparatus, configured to perform the method performed by the SMF network element in the method embodiments shown in FIG. 8, FIG. 10A and FIG. 10B, and FIG. 11A and FIG. 11B. For related features, refer to the foregoing method embodiments. Details are not described herein again. As shown in FIG. 15, the apparatus includes a receiving unit 1501 and a processing unit 1502.

The receiving unit 1501 is configured to receive a forwarding rule creation request of a policy control function network element. The forwarding rule creation request indicates to create a forwarding rule for a first session carrying a data stream, and the forwarding rule creation request includes information about a second session carrying the data stream.

The processing unit 1502 determines, based on the information about the second session, that the data stream is a data stream between terminal devices, configures the forwarding rule for the first session to local forwarding, and configures the forwarding rule for the second session to local forwarding.

In a possible implementation, the information about the second session includes an identifier of a port of the second session. When determining, based on the information about the second session, that the data stream is a data stream between the terminal devices, the processing unit 1502 may determine, based on a correspondence between an identifier of a port on a terminal device side and a session and based on the identifier of the port of the second session, that the data stream is a data stream between the terminal devices.

In a possible implementation, the information about the second session includes a session identifier of the second session. When determining, based on the information about the second session, that the data stream is a data stream between the terminal devices, the processing unit 1502 may determine, based on the identifier of the second session, that the data stream is a data stream between the terminal devices.

In embodiments of this disclosure, division into the units is an example and is merely logical function division, and may be other division during actual implementation. In addition, functional units in embodiments of this disclosure may be integrated into one processor, may exist alone physically, or two or more units may be integrated into one module. The foregoing integrated unit may be implemented in a form of hardware, or may be implemented in a form of a software functional module.

When the integrated unit is implemented in the form of a software functional unit and sold or used as an independent product, the integrated unit may be stored in a computer-readable storage medium. Based on such an understanding, the technical solutions of this disclosure essentially, or the part contributing to a conventional technology, or all or some of the technical solutions may be implemented in a form of a software product. The computer software product is stored in a storage medium and includes several instructions for instructing a terminal device (which may be a personal computer, a mobile phone, a network device, or the like) or a processor to perform all or some of the steps of the methods in embodiments of this disclosure. The storage medium includes: any medium that can store program code, such as a universal serial bus (USB) flash drive, a removable hard disk, a read-only memory (ROM), a random-access memory (RAM), a magnetic disk, or an optical disc.

In embodiments of this disclosure, both the base station and the terminal device may be presented in a form of functional modules obtained through division in an integrated manner. Herein, the "module" may be a particular application-specific integrated circuit (ASIC), a circuit, a processor that executes one or more software or firmware programs and a memory, an integrated logical circuit, and/or another component that can provide the foregoing functions.

In a simple embodiment, a person skilled in the art may figure out that the session management network element, the application function network element, and the policy control function network element may be in a form shown in FIG. 16.

A communication apparatus 1600 shown in FIG. 16 includes at least one processor 1601 and a memory 1602, and optionally, may further include a communication interface 1603.

The memory 1602 may be a volatile memory such as a RAM. Alternatively, the memory may be a non-volatile memory for example, a read-only memory, a flash memory, a hard disk drive (HDD), or a solid-state drive (SSD). Alternatively, the memory 1602 is any other medium that can be used to carry or store expected program code in a form of instructions or a data structure and that can be accessed by a computer. However, this is not limited thereto. The memory 1602 may be a combination of the foregoing memories.

In this embodiment of this disclosure, a specific connection medium between the processor 1601 and the memory 1602 is not limited. In this embodiment of this disclosure, the memory 1602 is connected to the processor 1601 through a bus 1604 in the figure. The bus 1604 is indicated by a bold line in the figure. A mode of connection between other components is schematically described, and is not limited thereto. The bus 1604 may be an address bus, a data bus, a control bus, or the like. For ease of denotation, the bus is represented by using only one bold line in FIG. 16, but it does not indicate that there is only one bus or only one type of bus.

The processor 1601 may have a data sending/receiving function, and can communicate with another device. In the apparatus shown in FIG. 16, an independent data transceiver module, for example, the communication interface 1603, may also be disposed and is configured to send/receive data. When communicating with another device, the processor 1601 may perform data transmission through the communication interface 1603.

When the session management network element is in the form shown in FIG. 16, the processor 1601 in FIG. 16 may invoke computer-executable instructions stored in the memory 1602, to enable the base station to perform the method performed by the base station in any one of the foregoing method embodiments.

Functions/implementation processes of the sending unit, the receiving unit, and the processing unit in FIG. 13 and FIG. 15 may be implemented by the processor 1601 in FIG. 16 by invoking the computer-executable instructions stored in the memory 1602. Alternatively, functions/implementation processes of the processing unit in FIG. 13 and FIG. 15 may be implemented by the processor 1601 in FIG. 16 by invoking the computer-executable instructions stored in the memory 1602, and functions/implementation processes of the sending unit and the receiving unit in FIG. 13 and FIG. 15 may be implemented through the communication interface 1603 in FIG. 16.

When the application function network element is in the form shown in FIG. 16, the processor 1601 in FIG. 16 may invoke computer-executable instructions stored in the memory 1602, to enable the base station to perform the method performed by the base station in any one of the foregoing method embodiments.

Functions/implementation processes of the sending unit, the receiving unit, and the processing unit in FIG. 12 may be implemented by the processor 1601 in FIG. 16 by invoking the computer-executable instructions stored in the memory 1602. Alternatively, functions/implementation processes of the processing unit in FIG. 12 may be implemented by the processor 1601 in FIG. 16 by invoking the computer-executable instructions stored in the memory 1602, and functions/implementation processes of the sending unit and the receiving unit in FIG. 12 may be implemented through the communication interface 1603 in FIG. 16.

When the policy control function network element is in the form shown in FIG. 16, the processor 1601 in FIG. 16 may invoke computer-executable instructions stored in the memory 1602, to enable the base station to perform the method performed by the base station in any one of the foregoing method embodiments.

Functions/implementation processes of the sending unit and the processing unit in FIG. 14 may be implemented by the processor 1601 in FIG. 16 by invoking the computer-executable instructions stored in the memory 1602. Alternatively, functions/implementation processes of the processing unit in FIG. 14 may be implemented by the processor 1601 in FIG. 16 by invoking the computer-executable instructions stored in the memory 1602, and functions/implementation processes of the sending unit in FIG. 14 may be implemented through the communication interface 1603 in FIG. 16.

A person skilled in the art should understand that the embodiments of this disclosure may be provided as a method, a system, or a computer program product. Therefore, this disclosure may use a form of hardware only embodiments, software only embodiments, or embodiments with a combination of software and hardware. Moreover, a form of a computer program product that is implemented on one or more computer usable storage media (including but not limited to a disk memory, a compact disc read-only memory (CD-ROM), and an optical memory) that include computer usable program code may be used in this disclosure.

This disclosure is described with reference to the flowcharts and/or block diagrams of the method, the device (system), and the computer program product according to this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

It is clear that a person skilled in the art can make various modifications and variations to this disclosure without departing from the scope of this disclosure. This disclosure is intended to cover these modifications and variations of this disclosure provided that they fall within the scope of protection defined by the following claims and their equivalent technologies.

What is claimed is:

1. A communication method implemented by an application function network element, wherein the communication method comprises:

obtaining transport information for a data stream, wherein the transport information comprises first information about an ingress port for the data stream and second information about an egress port for the data stream, wherein the first information comprises a first identifier of the ingress port, and wherein the second information comprises a second identifier of the egress port;

determining, based on the first identifier and the second identifier, that the data stream is between a first terminal device and a second terminal device, wherein the second identifier is of a first port on a first side of the second terminal device, and wherein the first identifier is of a second port on a second side of the first terminal device; and sending, in response to the data stream being between the first terminal device and the second terminal device, third information for triggering a core network device to configure a first policy and charging control (PCC) rule for a first session corresponding to the first information and configure a second PCC rule for a second session corresponding to the second information.

2. The communication method of claim 1, wherein determining that the data stream is between the first terminal device and the second terminal device comprises determining, based on a first association between the second identifier and the first session and a second association between the first identifier and the second session, that the data stream is between the first terminal device and the second terminal device.

3. The communication method of claim 1, wherein the data stream is from the first terminal device to the second terminal device.

4. The communication method of claim 1, wherein before obtaining the transport information, the communication method further comprises:

determining that the first terminal device and the second terminal device are capable of communicating with each other; and reporting, to a device in a time-sensitive networking network and based on first delay information of the first terminal device and second delay information of the second terminal device, a transmission delay between the second port and the first port.

5. The communication method of claim 4, wherein before obtaining the transport information, the communication method further comprises:

receiving the first delay information when the first terminal device establishes the first session; and receiving the second delay information and indication information when the second terminal device establishes the second session, wherein the indication information indicates that the second port and the first port are a port pair, wherein determining that the first terminal device and the second terminal device are capable of communicating with each other comprises determining, based on the indication information, that the first terminal device and the second terminal device are capable of communicating with each other.

6. The communication method of claim 1, wherein sending the third information for triggering the core network device to configure the first PCC rule comprises sending indication information to the core network device, and wherein the indication information indicates that the data stream is between the first terminal device and the second terminal device.

7. The communication method of claim 1, wherein sending the third information for triggering the core network device to configure the second PCC rule comprises sending indication information to the core network device, and wherein the indication information indicates that the data stream is between the first terminal device and the second terminal device.

8. A communication apparatus, comprising:

a memory configured to store instructions; and one or more processors coupled to the memory and configured to execute the instructions to cause the communication apparatus to:

obtain transport information for a data stream, wherein the transport information comprises first information about an ingress port for the data stream and second information about an egress port for the data stream, wherein the first information comprises a first identifier of the ingress port, and wherein the second information comprises a second identifier of the egress port;

determine, based on the first identifier and the second identifier, that the data stream is between a first terminal device and a second terminal device, wherein the second identifier is of a first port on a first side of the second terminal device, and wherein the first identifier is of a second port on a second side of the first terminal device; and send, in response to the data stream being between the first terminal device and the second terminal device, third information for triggering a core network device to configure a first policy and charging control (PCC) rule for a first session corresponding to the first information and configure a second PCC rule for a second session corresponding to the second information.

9. The communication apparatus of claim 8, wherein the instructions further cause the communication apparatus to determine, based on a first association between the second identifier and the first session and a second association between the first identifier and the second session, that the data stream is between the first terminal device and the second terminal device.

10. The communication apparatus of claim 8, wherein the data stream is from the first terminal device to the second terminal device, wherein the first session is established by the first terminal device, and wherein the second session is established by the second terminal device.

11. The communication apparatus of claim 8, wherein before obtaining the transport information, the instructions further cause the communication apparatus to:

determine that the first terminal device and the second terminal device are capable of communicating with each other; and report, based on first delay information of the first terminal device and second delay information of the second terminal device, a transmission delay between the second port and the first port to a device in a time sensitive networking.

12. The communication apparatus of claim 11, wherein before obtaining the transport information, the instructions further cause the communication apparatus to:

receive, when the first terminal device establishes the first session, the first delay information;

receive, when the second terminal device establishes the second session, the second delay information and indication information, wherein the indication information indicates that the second port and the first port are a port pair; and determine, based on the indication information, that the first terminal device and the second terminal device are capable of communicating with each other.

13. The communication apparatus of claim 8, wherein the instructions further cause the communication apparatus to send indication information to the core network device, and wherein the indication information indicates that the data stream is between the first terminal device and the second terminal device.

14. A computer program product comprising instructions that are stored on a non-transitory computer-readable storage medium and that, when executed by one or more processors, cause an application function network element to:

obtain transport information for a data stream, wherein the transport information comprises first information about an ingress port for the data stream and second information about an egress port for the data stream, wherein the first information comprises a first identifier of the ingress port, and wherein the second information comprises a second identifier of the egress port;

determine, based on the first identifier and the second identifier, that the data stream is between a first terminal device and a second terminal device, wherein the second identifier is of a first port on a first side of the second terminal device, and wherein the first identifier is of a second port on a second side of the first terminal device; and send, in response to the data stream being between the first terminal device and the second terminal device, third information for triggering a core network device to configure a first policy and charging control (PCC) rule for a first session corresponding to the first information and configure a second PCC rule for a second session corresponding to the second information.

15. The computer program product of claim 14, wherein the instructions, when executed by the one or more processors, that cause the application function network element to determine that the data stream is between the first terminal device and the second terminal device, further cause the application function network element to determine, based on a first association between the second identifier and the first session and a second association between the first identifier and the second session, that the data stream is between the first terminal device and the second terminal device.

16. The computer program product of claim 14, wherein to obtain the transport information, the instructions, when executed by the one or more processors, further cause the application function network element to:

determine that the first terminal device and the second terminal device are capable of communicating with each other; and report, to a device in a time-sensitive networking network and based on first delay information of the first terminal device and second delay information of the second terminal device, a transmission delay between the second port and the first port.

17. The computer program product of claim 16, wherein to obtain the transport information, the instructions, when executed by the one or more processors, further cause the application function network element to:

receive the first delay information when the first terminal device establishes the first session; and receive the second delay information and indication information when the second terminal device establishes the second session, wherein the indication information indicates that the second port and the first port are a port pair.

18. The computer program product of claim 17, wherein the instructions, when executed by the one or more processors, further cause the application function network element to determine, based on the indication information, that the first terminal device and the second terminal device are capable of communicating with each other.

19. The computer program product of claim 14, wherein to send the third information, the instructions, when executed by the one or more processors, further cause the application function network element to send indication information to the core network device, and wherein the indication information indicates that the data stream is between the first terminal device and the second terminal device.

20. The computer program product of claim 14, wherein the data stream is from the first terminal device to the second terminal device.

\* \* \* \* \*